United States Patent
Brewer et al.

(10) Patent No.: US 6,262,777 B1
(45) Date of Patent: Jul. 17, 2001

(54) METHOD AND APPARATUS FOR SYNCHRONIZING EDITED AUDIOVISUAL FILES

(75) Inventors: Eric T. Brewer, Saratoga; Andrew Palfreyman, Sunnyvale; Greg C. Ames, Redwood City, all of CA (US)

(73) Assignee: FutureTel, Inc., Sunnyvale, CA (US)

(*) Notice: Subject to any disclaimer, the term of this patent is extended or adjusted under 35 U.S.C. 154(b) by 0 days.

(21) Appl. No.: 08/948,380

(22) Filed: Oct. 9, 1997

Related U.S. Application Data

(60) Provisional application No. 60/046,823, filed on Nov. 15, 1996.

(51) Int. Cl.[7] .................................................... H04N 9/475
(52) U.S. Cl. ......................... 348/515; 348/512; 348/500; 348/423.1; 386/96
(58) Field of Search ................................... 348/500, 501, 348/515, 512, 513, 584, 423.1, 425.4; 386/4, 52, 53, 54, 55, 12, 96; H04N 9/475

(56) References Cited

U.S. PATENT DOCUMENTS

| | | | |
|---|---|---|---|
| 4,523,227 | * 6/1985 | Hurst | 358/105 |
| 4,766,501 | * 8/1988 | Hjelm et al. | 358/311 |
| 5,802,245 | * 9/1998 | Kunihiro | 386/98 |
| 5,815,634 | * 9/1998 | Daum et al. | 348/515 |
| 5,917,988 | * 6/1999 | Eto | 386/52 |
| 5,959,684 | * 9/1999 | Tan et al. | 348/515 |
| 5,982,447 | * 11/1999 | Nakamura | 348/515 |
| 5,999,692 | * 12/1999 | Schmidt et al. | 386/54 |
| 6,016,380 | * 1/2000 | Norton | 386/52 |
| 6,046,971 | * 4/2000 | Ogasawara | 369/124 |
| 6,076,062 | * 6/2000 | Van Steenbrugge | 348/515 |

\* cited by examiner

Primary Examiner—Reinhard J. Eisenzopf
Assistant Examiner—Jean W. Désir
(74) Attorney, Agent, or Firm—Beyer Weaver & Thomas, LLP

(57) ABSTRACT

Disclosed are methods and apparatuses for stitching a first and second audiovisual segment together. By way of example, each audiovisual segment has a multiplicity of audio frames including a first audio frame, a second audio frame that sequentially follows the first audio frame and a last audio frame. The audiovisual segment further includes a multiplicity of video frames having a first video frame and a last video frame. The method includes the step of aligning an initial audio frame in the first audiovisual segment with the first video frame in the first audiovisual segment. The first audio frame from the first audiovisual segment is designated as the initial audio frame when a tab error associated with the first audio frame from the first audiovisual segment is less than about half a frame. On the other hand, the second audio frame from the first audiovisual segment is designated as the initial audio frame when a tab error associated with the first audio frame from the first audiovisual segment is greater than half a frame. Stitching the first and second audiovisual segments together.

28 Claims, 17 Drawing Sheets

| TAB | TAB ERROR | EXISTING STREAM ERROR | CUMULATIVE ERROR | DROP/RETAIN | NEW STREAM ERROR |
|---|---|---|---|---|---|
| 706 | 0.2 | 0.0 | 0.2 | RETAIN | 0.2 |
| 708 | 0.5 | 0.2 | 0.7 | DROP | -0.3 |
| 710 | 0.4 | -0.3 | 0.1 | RETAIN | 0.1 |
| 712 | 0.6 | 0.1 | 0.7 | DROP | -0.5 |
| 714 | 0.9 | -0.5 | 0.4 | RETAIN | 0.4 |
| 716 | 0.1 | 0.4 | 0.5 | RETAIN | 0.5 |
| 718 | 0.1 | 0.5 | 0.6 | DROP | 0.4 |
| 720 | 0.3 | 0.4 | 0.7 | DROP | 0.1 |

METHOD AND APPARATUS FOR SYNCHRONIZING EDITED AUDIOVISUAL FILES

CROSS REFERENCE TO RELATED APPLICATIONS

This application claims the benefit of U.S. Provisional Application No. 60/046,823 filed on Nov. 15, 1996, the disclosure of which is incorporated herein by reference.

This application is related to the following U.S. patent applications: (1) U.S. patent application Ser. No. 08/947,771 filed on the same day as the instant application, naming Eric T. Brewer, Andrew Palfreyman and Thomas S. Gilley as inventors, and entitled "METHOD AND APPARATUS FOR EDITING VIDEO FILES"; (2) U.S. patent application Ser. No. 08/947,646 filed on the same day as the instant application, naming Eric T. Brewer, Andrew Palfreyman as inventors, and entitled "METHOD AND APPARATUS FOR SEEKING WITHIN AUDIOVISUAL FILES"; (3) U.S. patent application Ser. No. 08/948,352 filed on the same day as the instant application, naming Eric T. Brewer, Andrew Palfreyman, and Thomas S. Gilley as inventors, and entitled "METHOD AND APPARATUS FOR CLIPPING VIDEO SEGMENTS FOR AN AUDIOVISUAL FILE"; (4) U.S. patent application Ser. No. 08/948,350 filed on the same day as the instant application, naming Eric T. Brewer, Andrew Palfreyman, and Thomas S. Gilley as inventors, and entitled "METHOD AND APPARATUS FOR STITCHING EDITED VIDEO SEGMENTS"; and (5) U.S. patent application Ser. No. 08/947,844 filed on the same day as the instant application, naming Eric T. Brewer, Andrew Palfreyman as inventors, and entitled "METHOD AND APPARATUS FOR COPYING AN AUDIOVISUAL SEGMENT." All above identified applications are hereby incorporated by reference.

BACKGROUND OF THE INVENTION

1. Field of the Invention

The present invention relates generally to editing audiovisual files. More particularly, the invention relates to various methods and apparatuses for maintaining the audio component of a bit stream substantially synchronized with the video component after performing editing operations are discussed.

2. Description of the Related Art

MPEG (motion pictures experts group) is a standard promulgated by the International Standards Organization (ISO) to provide a syntax for compactly representing digital video and audio signals. The syntax generally requires that a minimum number of rules be followed when bit streams are encoded so that a receiver of the encoded bit stream may unambiguously decode the received bit stream. As is well known to those skilled in the art, a bit stream will also include a "system" component in addition to the video and audio components. Generally speaking, the system component contains information required for combining and synchronizing each of the video and audio components into a single bit stream.

Since the initial unveiling of the first MPEG standard entitled MPEG-1, a second MPEG standard known as MPEG-2 was introduced. In general, MPEG-2 provided an improved syntax to enable a more efficient representation of broadcast video. By way of background, MPEG-1 was optimized to handle data at a rate of 1.5 Mbits/second and reconstruct about 30 video frames per second, with each frame having a resolution of 352 pixels by 240 lines (NTSC), or about 25 video frames per second, each frame having a resolution of 352 pixels by 288 lines (PAL). Therefore, decoded MPEG-1 video generally approximates the perceptual quality of consumer video tapes (VHS). In comparison, MPEG-2 is designed to represent CCIR 601-resolution video at data rates of 4.0 to 8.0 Mbits/second and provide a frame resolution of 720 pixels by 480 lines (NTSC), or 720 pixels by 576 lines (PAL). For simplicity, except where distinctions between the two versions of the MPFG standard exist, the term "MPEG," will be used to reference video and audio encoding and decoding algorithms promulgated in current as well as future versions.

Typically, a decoding process begins when, an MPEG bit stream containing video, audio and system information is demultiplexed by a system decoder that is responsible for producing separate encoded video and audio bit streams that may subsequently be decoded by a video decoder and an audio decoder. Attention is now directed at the structure of an encoded video bit stream. Generally, an encoded MPEG video bit stream is organized in a distinguishable data structure hierarchy. At the highest level in the hierarchy is a "video sequence" which may include a sequence header, one or more groups of pictures (GOPs) and an end-of sequence code. GOPs are subsets of video sequences, and each GOP may include one or more pictures. As will be described below, GOPs are of particular importance because they allow access to a defined segment of a video sequence, although in certain cases, a GOP may be quite large.

Each picture within a GOP is then partitioned into several horizontal "slices" defined from left to right and top to bottom. The individual slices are in turn composed of one or more macroblocks which identify a square area of 16-by-16 pixels. As described in the MPEG standard, a macroblock includes four 8-by-8 pixel "luminance" components, and two 8-by-8 "chrominance" components (i.e., chroma red and chroma blue).

Because a large degree of pixel information is similar or identical between pictures within a GOP, the MPEG standard takes particular advantage of this temporal redundancy and represents selected pictures in terms of their differences from a particular reference picture. The MPEG standard defines three general types of encoded picture frames. The first type of frame is an intra-frame (I-frame). An I-frame is encoded using information contained in the frame itself and is not dependent on information contained in previous or future frames. As a result, an I-frame generally defines the starting point of a particular GOP in a sequence of frames.

A second type of frame is a predicted-frame (P-frame). P-frames are generally encoded using information contained in a previous I or P frame. As is well known in the art, P frames are known as forward predicted frames. The third type of frame is a bi-directional-frame (B-frame). B-frames are encoded based on information contained in both past and future frames, and are therefore known as bi-directionally predicted frames. Therefore, B-frames provide more compression that both I-frames and P-frames, and P-frames provide more compression than I-frames. Although the MPEG standard does not require that a particular number of B-frames be arranged between any I or P frames, most encoders select two B-frames between I and P frames. This design choice is based on factors such as amount of memory in the encoder and the characteristics and definition needed for the material being coded.

Although the MPEG standard defines a convenient syntalx for compactly encoding video and audio bit steams. Audio synchronization difficulties arise when a copied audiovisual bit stream segment is joined with another copied audiovisual bit stream segment. The synchronization problem is partially due to the fact that audio frames and video frames rarely have a one-to-one correlation. Therefore, when a segment of video frames is identified for copying from a file, the identified video frames will not have a pre-determined number of audio frames that correspond to the identified video frames.

Consequently, when a segment of video is copied from a file and then subsequently joined to another copied segment, the audio component of the copied segment may not be synchronized with the proper video frame. Once the video and audio frames are no longer synchronized, an "error" representing the number or percentage of an audio frame for which the video and audio frames fail to be synchronized is introduced into the resulting bit stream. By way of example, the synchronization error introduced from two bit stream segments being joined may be as little as a fraction of an audio frame, to as large as a few audio frames.

Although the error associated with joining only two bit stream segments may in certain cases only be a few audio frames, when a multiplicity of bit stream segments are joined in a more sophisticated editing task, the errors for each joined segment are summed. Therefore, the resulting error may be quite large, and the resulting audio frames may be severely un-synchronized and fail to make sense upon playback. Further, un-synchronized audio and video bit streams typically produce audio discontinuities at the bit stream locations where segments are joined. This problem is commonly described as a "popping" sound. Thus, as discontinuities are introduced to joined bit stream segments, discomforting popping sounds are introduced causing the resulting audio stream to not only be un-synchronized, but also intolerable.

In view of the foregoing, what is needed are methods and apparatuses for editing audio and video bit streams while ensuring that the audio component remains substantially synchronized with the video component.

SUMMARY OF THE INVENTION

To achieve the foregoing in accordance with the purpose of the present invention, methods and apparatuses for maintaining edited audiovisual files substantially synchronized during editing operations performed through the use of an editing engine are disclosed. Preferably, the editing engine performs editing operations in two passes through an edit list. In one embodiment, the edit list may contain a number of copying requests instructing the editing engine to create a copy operator for copying segments of audio and video from certain files. To initiate copy operations, the editing engine preferably performs a first pass where the copied segments of an audio and video have an audio component that is preferably longer in time than the video component.

In one embodiment, a method of stitching a first and second audiovisual segment together is disclosed. In this embodiment, each audiovisual segment has a multiplicity of audio frames including a first audio frame, a second audio frame that sequentially follows the first audio frame and a last audio frame. The audiovisual segment further includes a multiplicity of video frames having a first video frame and a last video frame. The method includes the step of aligning an initial audio frame in the first audiovisual segment with the first video frame in the first audiovisual segment. The first audio frame from the first audiovisual segment is designated as the initial audio frame when a tab error associated with the first audio frame from the first audiovisual segment is less than about half a frame. On the other hand, the second audio frame from the first audiovisual segment is designated as the initial audio frame when a tab error associated with the first audio frame from the first audiovisual segment is greater than half a frame. Stitching the first and second audiovisual segments together.

In another embodiment, a predetermined number of audio frames at each end of the copied audio segment may be decoded and re-encoded to generate glue frames which may provide, e.g., sound fading and blending effects. Once the copied segments of audio are processed in the first pass, the editing engine will initiate a second pass through the editing list to stitch together (i.e., join) the processed audio and video segments into a single file. Advantageously, during the stitching operation, frames at the ends of each copied audio segment (i.e., tab-in and tab-out audio frames) may be dropped or retained in order to maintain the audio component in the newly created audiovisual file substantially synchronized with the video component. Therefore, the newly created file is advantageously made up of one or more audiovisual segments that preferably has an audio component that is no more than about half an audio frame in error.

In yet another embodiment, a method for copying a segment from an audiovisual file having a multiplicity of audio frames and a multiplicity of video frames is disclosed. In a first step, a mark-in location in a video file is selected to correspond to a first video frame in the segment such that the first video frame has an associated start time. Next, a mark-out location in the video file is selected to correspond to a last video frame in the segment, and the last video frame having an associated end time. Once the mark-in video frame is selected, a first audio frame having a first audio frame start time that is at least as early as the first video frame start time is designated as an initial audio frame. A second audio frame having a second audio frame start time that is at least as late as the last video frame end time is designated as the last audio frame. The audiovisual file is copied to include a video portion extending from the first video frame to the last video frame and an audio portion extending from the initial audio frame to the last audio frame. In this manner, the audio portion of the segment may preferably be longer than the video portion of the copied segment.

In still another embodiment, a method of joining a first and a second audiovisual segment together while maintaining substantial audio to video synchronization is disclosed. Each audiovisual segment having a multiplicity of audio frames including a first audio frame, a second audio frame that sequentially follows the first audio frame and a last audio frame. A multiplicity of video frames including a first video frame and a last video frame are also disclosed. In this embodiment, the method includes a step of aligning an initial audio frame in the first audiovisual segment with the first video frame in the first audiovisual segment. Preferably, the first audio frame from the first audiovisual segment is designated as the initial audio frame when a tab error associated with the first audio frame from the first audiovisual segment is less than about half an audio frame. Further, the second audio frame from the first audiovisual segment is designated as the initial audio frame when a tab error associated with the first audio frame from the first audiovisual segment is greater than about half an audio frame. On the other hand, the first audio frame from the first audiovisual segment is dropped when the second audio frame from the first audiovisual segment is designated as the initial audio frame.

The method further includes determining whether a cumulative error associated with the last audio frame in the first segment exceeds half a frame, and dropping the last audio frame in the first segment when it is determined that the cumulative error associated with the last audio frame exceeds half a frame. The method then determines whether a cumulative error associated with the first audio frame in the second segment exceeds about half a frame, and dropping the first audio frame in the second segment when it is determined that the cumulative error associated with the first audio frame exceeds about half a frame.

Although the advantages are numerous, a particular advantage of this invention is that the stream error is prevented from exceeding about half an audio frame, and the video frames are substantially synchronized with the audio frames without regard to the number of segments being stitched together after successive copy operations. It should also be appreciated that if corrections were not made by dropping or retaining audio frames in the second pass as described above, the cumulative stream error would grow and propagate as additional audiovisual segments are stitched together.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

Broadly speaking, the present invention discloses methods and apparatuses for maintaining edited audiovisual files synchronized during editing operations performed through the use of an inventive editing engine. Preferably, the editing engine performs editing operations in two passes through an edit list. Generally, an edit list may be provided by an application requesting that certain operations be performed on a number of files containing MPEG audio and video data. In one embodiment, the edit list may contain a number of copying requests instructing the editing engine to create a copy operator for copying audiovisual segments from certain files.

To initiate copy operations, the editing engine preferably performs a first pass where the audiovisual segment will have an audio component that is preferably longer in time than the video component. In another embodiment, a pre-determined number of audio frames at each end of the copied audio segment may be decoded and re-encoded to generate glue audio frames which may provide, e.g., sound fading and blending effects. Once the copied segments of audio are processed in the first pass, the editing engine may initiate a second pass through the editing list to stitch together (i.e., join) the processed audio and video frames into one file. Advantageously, during the stitching operation, frames at the ends of each copied audio segment may be dropped or retained in order to maintain the audio component in the newly created file substantially synchronized with the video component. Therefore, the newly created file is preferably made up of one or more copied audiovisual segments. In one embodiment, the new file preferably has an audio component that is no more than about half an audio frame off from being exactly synchronized with the video component.

Figure 1A:
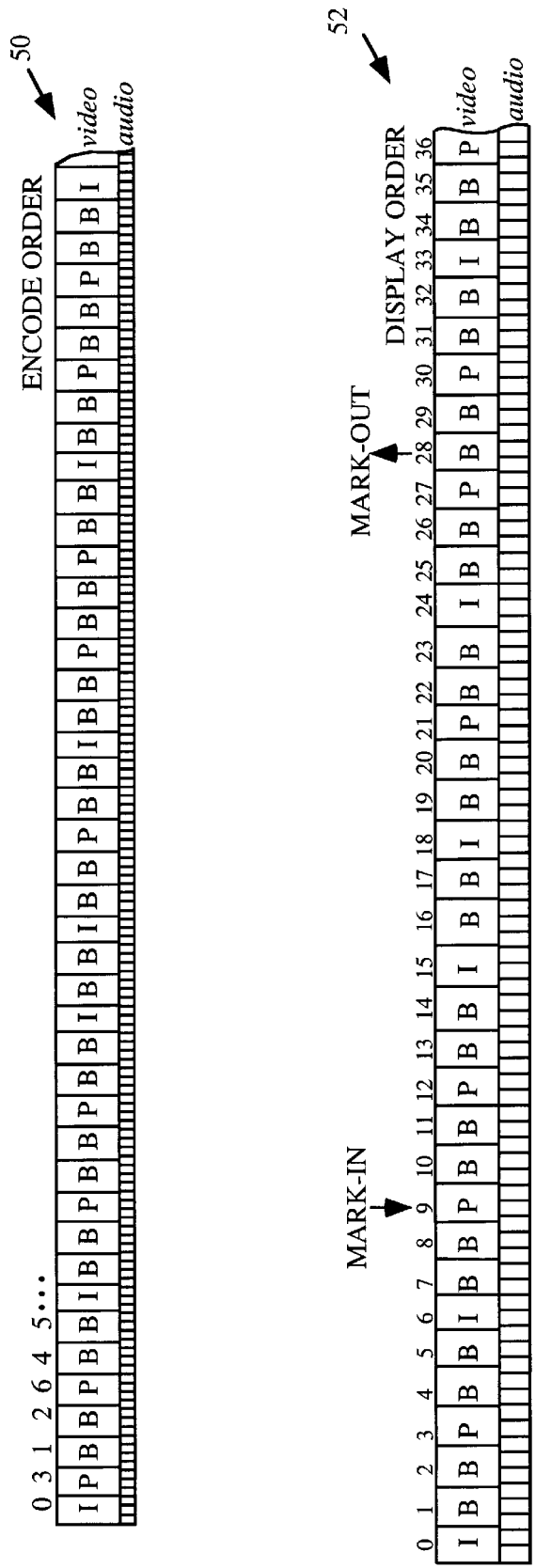
FIG. 1A shows a number of exemplary audiovisual frame sequences used to describe the processing steps associated with generating an audio component that is substantially synchronized with the video component in accordance with one embodiment of this invention.

FIG. 1A shows a number of exemplary audio and video frame sequences used to describe the processing steps associated with generating an audio component that is substantially synchronized with the video component. An exemplary encode order stream 50 of video frames are presented to illustrate the order in which video frames are encoded after being processed in accordance the MPEG standard format. By way of example, in encode order stream 50, the first frame is an I-frame which is followed by a P-frame, a B-frame, a B-frame, a P-frame, a B-frame, a B-frame, a B-frame, etc. Although the editing algorithm of this invention may process a sequence of frames in any suitable arrangement, the editing algorithm of this invention preferably processes frame sequences in a display order. Therefore, before processing operations are performed, the encode order stream 50 is converted into a display order stream.

Thus, a frame stream arranged in temporal order from frame 0 to 36 identifies the order in which frames are processed in a display order stream 52. For comparison, the corresponding temporal order of the frames in encode order stream 50 are illustrated under the corresponding frames. Of course, it should be understood that display order stream 52 is merely exemplary, and other suitable display order streams may also be suitably processed in accordance with the teachings of this invention.

When a segment of video frames are copied from display order stream 52, a mark-in location and a mark-out location is selected to identify the number of video frames being copied. By way of example, a mark-in location is selected at frame 9, which is a P-frame, and a mark-out location is identified as frame 28, which is a B-frame. Accordingly, the segment of frames copied from display order stream 52 will include frames 9 through 28. As shown, the identified segment will also include associated audio frames.

As is well known in the art, each audio frame may vary in size depending on the type of MPEG audio layer being copied. The MPEG audio standard specifically identifies three layers, each layer having an associated frame rate and a variety of identifying characteristics. By way of example, MPEG layer 2 audio may have frame rates between about 28 and 38 frames per second. Other exemplary characteristics may include an audio mode (e.g., stereo, mono, surround sound, etc.), and a sampling frequency (e.g., 32 kHz, 44.1 kHz and 48 kHz). As described in the MPEG audio documents, each audio frame preferably include an associated header which identify the particular characteristics of the audio samples that follow each header. However, for ease of illustration, the audio frames will be described as pure pulse code modulation (PCM) audio samples.

As illustrated in display order stream 52, exemplary audio frames are shown lying under their associated video frames. The pictorial audio and video frame representation is used to identify the "time" positioning of audio frames with respect to the associated video frames in a representative MPEG bit stream.

Figure 1B:
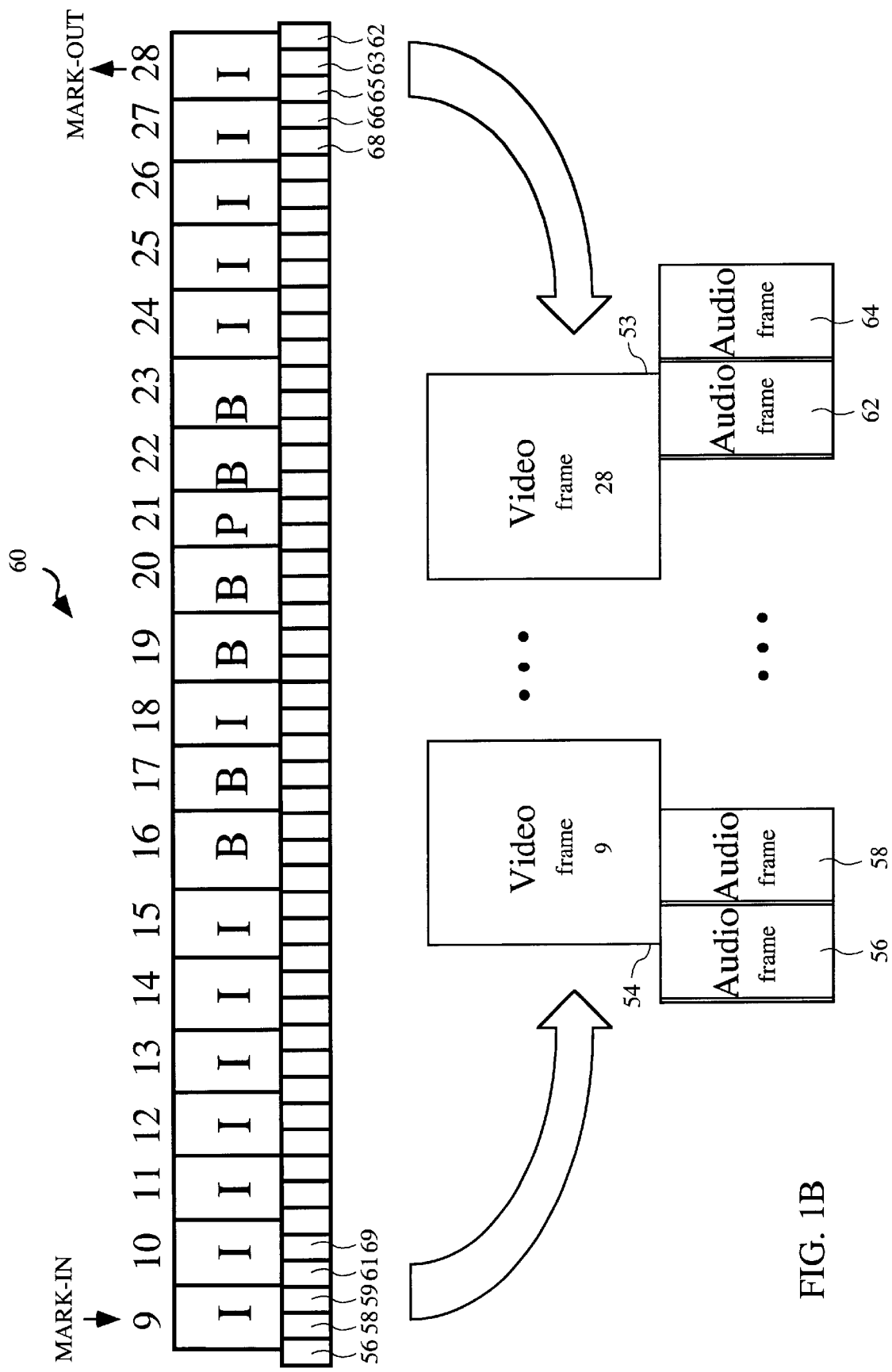
FIG. 1B is an exemplary audiovisual segment copied from the display order stream of FIG. 1A in accordance with one embodiment of the present invention.

FIG. 1B shows an audiovisual segment 60 after it has been copied from display order stream 52 of FIG. 1A in accordance with one embodiment of the present invention. As shown, video frames 9 through 28 and an initial audio frame 56 and an end audio frame 62 were copied from display order stream 52. During the initial copying step, the copied audio segment preferably occupies a longer length of time than the copied video segment.

As will be described in greater detail below, once frame 9 is identified as the mark-in video frame, a determination is made to copy audio frames such that the beginning time of the initial audio frame 56 is the same as a start time 54 of the mark-in frame 9 or earlier. Similarly, once frame 28 has been identified as the mark-out video frame, a determination is made to copy audio frames such that the beginning time of the end audio frame 62 is the same time as a end time 53 of the mark-out frame 28 or earlier.

In simple terms, if an audio frame does not perfectly align with the start time 54 of the mark-in video frame 9 or the end time 53 of the mark-out video frame 28, then the initial audio frame 56 will have an earlier start time than the start time 54 of the mark-in video frame, and the end audio frame 62 will have an earlier start time than the end time 53 of the mark-out video frame 28. In this example, audio frame 56 will be selected as the initial audio frame and audio frame 62 will be selected as the end audio frame. It is of particular importance to appreciate that audio frame 64 has a start time that is later than the end time 53 of mark-out video frame 28, and is therefore not copied. Accordingly, only audio frames up to audio frame 62 are copied during the first pass.

Figure 2:
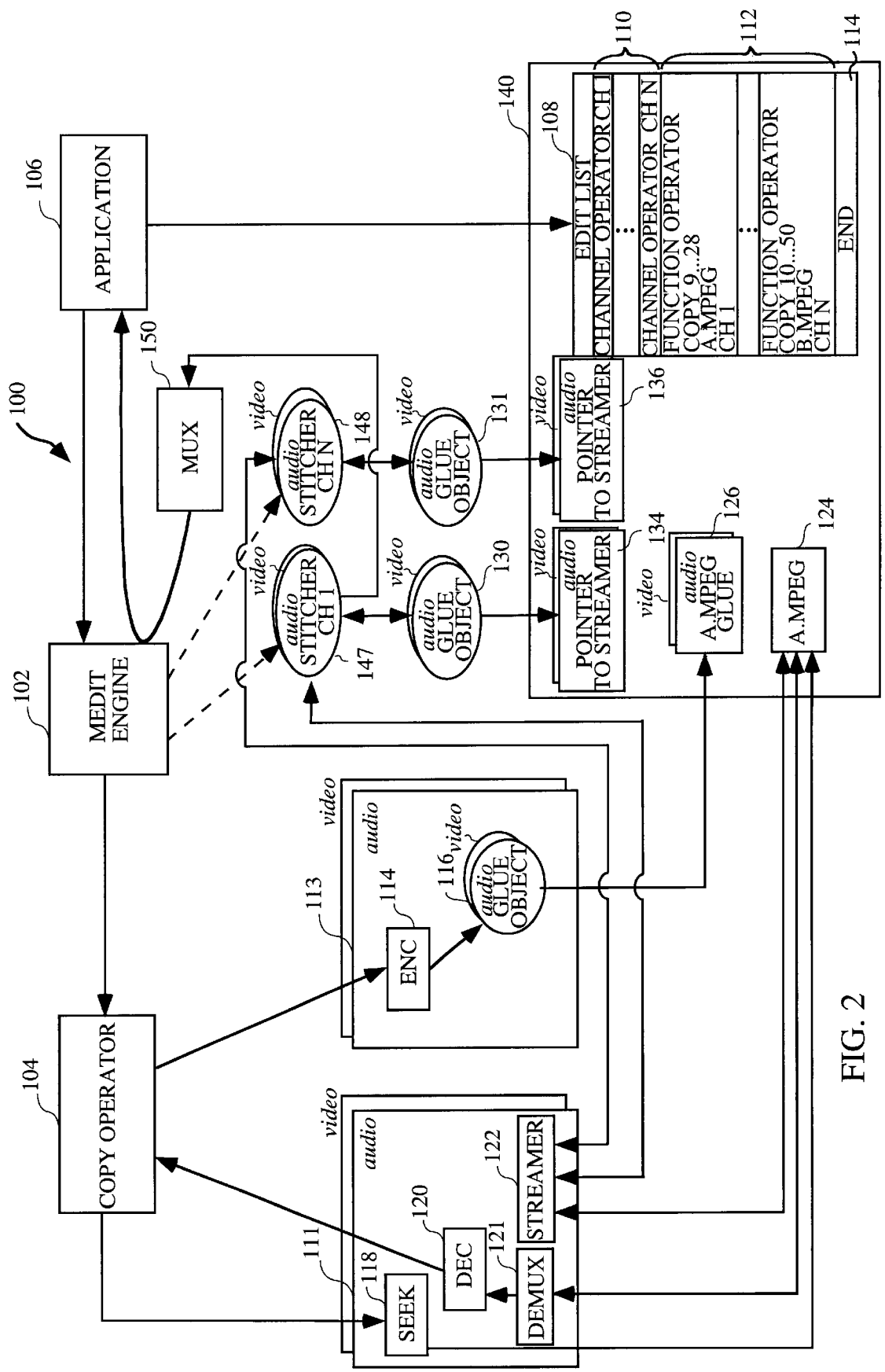
FIG. 2 is a data flow architecture used for editing iudiovisual files in accordance with one embodiment of this invention.

FIG. 2 is a data flow architecture 100 used for editing audiovisual files in accordance with one embodiment of this invention. As shown, a similar architecture (e.g., shown as shadowed objects) is used for editing the video component of a file. As described in a co-pending related application, video files may be edited in parallel using the shadowed architecture described herein. For a detailed description of the methods and apparatuses used for editing video files, reference may be made to the above incorporated by reference related U.S. patent applications: (1) Ser. No. 08/947,771; (2) Ser. Nos. 08/948,352; and 08/948,350.

The data flow architecture 100 is preferably driven by an editing engine referred to as MEDIT engine 102 which is capable of performing a number of editing tasks. By way of example, such tasks may include copy operations requesting that a segment from a source or input stream file be copied for use in another file. Other suitable editing tasks may include a fade operation, a blend operation, a morphing operation, a titling operation, a text annotation operation, etc. In general, MEDIT engine 102 is a dynamic engine that is capable of managing numerous editing tasks which may vary depending on the types of operators provided by an application requesting an editing task. It should therefore be understood that, MEDIT engine 102 may manage any number of operator types, including operator "plug-ins" provided by future applications requesting sophisticated editing tasks.

As an overview, the following discussion will provide a general description of the processing steps taken by MEDIT engine 102 in performing editing tasks such as copying an audiovisual segment from a source file. Generally, a copy operation is initiated when an application 106 requests that a copy operation be performed.

Initially, application 106 will provide MEDIT engine 102 with a suitable edit list 108 that includes a number of "channel operators" 110 identifying the number of channels requiring some type of editing, "function operators" 112 identifying the type of editing functions requested by application 106, and an "end operator" 114 identifying the end of an editing request. In the example shown, the function operators 112 identify "copy" requests. By way of example, the first copy request identified in function operators 112 is a request for copying frames 9 through 28 in a file called A.MPEG for channel 1. As shown, there may be numerous other copy requests in function operators 112 leading up to a request for copying frames 10 through 25 in a file called B.MPEG for channel N. Of course, once the video frames are identified for copying, the associated audio frames are preferably selected for copying as described above.

Once MEDIT engine 102 receives edit list 108, the copy requests are processed in two identifiable passes through edit list 108. In a first pass, MEDIT engine 102 walks through edit list 108 selecting the correct number of audio frames such that the audio component is longer in time than the video component. Preferably, the initial audio frame is selected to begin at or before the start time of the mark-in video frame, and the end audio frame is selected to begin at or before the end time of the mark-out video frame. For ease of description, the initial audio frame will be referred to as a "tab-in" audio frame and the end audio frame will be referred to as the "tab-out" audio frame.

Once the appropriate tab-in and tab-out frames are selected, and the number of audio frames in a copied segment may be ascertained, and the copy operator may process (i.e., decode and re-encode) a predetermined number of audio frames beginning with the tab-in frame to generate in-glue segments, and may also process a predetermined number of audio frames up to the tab-out frame to generate out-glue segments. Once any glue segments are generated for the copied audio segment, the glue segments are stored in an appropriate storage medium 140. It should be understood that storage medium 140 may be any suitable storage medium such as a cache memory, a computer hard drive, floppy disk, or a remotely located storage medium connected by a suitable network.

In the second pass, the MEDIT engine 102 may make use of the previously generated glue segments by joining the glue segments and un-processed audio frame segments (i.e., middle glue) with the aid of a plurality of stitcher objects 147 and 148 that are created by MEDIT engine 102. As will be described in greater detail below, a stitcher object will be created for each channel in edit list 108, and each created stitcher object associated with a particular channel is responsible for walking through edit list 108 and joining glue segments for its own channel (e.g., ignoring information associated with other channels).

In this manner, multiple stitcher objects may be created such that each channel identified in edit list 108 has its own stitcher object. In a preferred embodiment, each stitcher will be responsible for joining the particular glue segments in a proper time ordered manner, such that each generated segment is time stamped to generate an appropriate audio sequence. Further, each created stitcher object uses a glue object such as glue objects 130 and 131 to pull the glue segments from the previously generated in-glue or out-glue files, or retrieve the middle glue from the original file by using pointers which identify the location of the middle-glue segment. With reference to audiovisual segment 60 of FIG. 1B, if audio frames 56, 58, 59, and 61 were decoded and re-encoded to generate an in-glue segment, and audio frames 66, 65, 63 and 62 were decoded and re-encoded to generate an out-glue segment, the remaining frames lying between audio frames 61 and 66 will represent an exemplary middle-glue segment. Once the stitched frame data is output as a program elementary stream (PES) to a multiplexer 150, the multiplexer 150 will pull PES data from all of the created stitchers (i.e., input sources) and output the copied segments to application 106 through MEDIT engine 102.

To illustrate the overall data flow of FIG. 2, assume application 106 requests a copy operation of video frames 9 through 28 from A.MPEG file 124 (i.e., display order stream 52 of FIG. 1A) from channel 1. As MEDIT engine 102 walks through edit list 108 during a first pass, MEDIT engine 102 determines whether audio glue segments have already been generated and stored in a glue file 126 during a previous editing request. Assuming that no audio glue segments already exist for a copy operation of video frames 9 through 28 from A.MPEG file 124, MEDIT engine 102 will create copy operator 104 which creates a control object 111 (e.g., control object).

In this embodiment, control object 111 uses a seek engine 118 to locate the appropriate video frames identified for copying data from A.MPEG file 124. For a more detailed description on suitable seeking engines, reference may be made to a related U.S. patent application Ser. No. 08/947,646, which is hereby incorporated by reference.

Once the appropriate frames are located and the appropriate number of audio frames including the tab-in and tab-out frames have been selected, a decoder 120 may decode a predetermined number of audio frames beginning with the tab-in or ending with the tab-out audio frame. Generally speaking, the audio glue frames represent audio frames that are processed to introduce audio effects such as, e.g., fading "to or from" zero. Further, it should be understood that generating "in and out" glue segments is an optional process step that may be implicitly set by the parameters in the copy operator 102 or may be expressly requested by the parameters sent by the application 106. Therefore, if glue generation is required, a predetermined number of audio frames may be decoded one frame at a time by decoder 120. It should be understood that a decoder buffer used should be managed in order to satisfy decoding requirements defined in the MPEG standard.

Once an audio frame is decoded, the decoded data is sent to copy operator 104. Copy operator 104 then sends the decoded data to another control object 113 (e.g., control object) created by copy operator 104 and having an encoder 114. At this point, encoder 114 re-encodes the audio frame data into an appropriate format and calls a glue object 116 that stores re-encoded audio frames into a glue file. As shown, the glue file is preferably stored in storage medium 140 which may be cache memory. Once all of the predetermined number of audio glue frames are optionally decoded and re-coded for each of the in-glue and the out-glue segments, the segments are stored in an appropriate glue file such as A.MPEG glue file 126.

It should be appreciated, that MEDIT engine 102 will generally create separate copy operators for each copy request in edit list 108. Therefore, the second copy operation request in the edit list (i.e., video frames 10 through 50 from B.MPEG file, channel N) is preferably processed by a separate copy operator 104 which will in turn create a new control object 111 for its own seeking and decoding functions, and a new control object 113 for re-encoding and transferring the generated glue frames to its corresponding glue file that may be stored within storage medium 140.

In one embodiment, execution of each copy operator may be processed by multiple processing units in a parallel format which advantageously expedites any editing requests identified in edit list 108. Further, parallel processing is facilitated since there is no set evaluation order in the edit list, and each editing operation may be performed independently of each other. In a further embodiment, multiple processing may be accomplished through the use of internet video servers. As is well known in the art, internet video servers may be used to simultaneously process editing requests in edit list 108.

Referring still to FIG. 2, once appropriate glue files are generated for each copy request in edit list 108, MEDIT engine 102 will walk through edit list 108 in a second pass to create stitcher objects such as stitcher objects 147 and 148 for each channel identified in edit list 108. Although only two stitcher objects are shown created for channel 1 and channel N, it should be understood that there may be any number of stitcher objects created depending on the number of channels identified in edit list 108. By way of example, in some embodiments, edit list 108 may contain stitcher objects for multiple channels up to about 8,000 audio channels and about 4,000 video channels under an MPEG-2 platform.

Once a stitcher object is created for each channel, each stitcher object 147 and 148 will preferably create glue objects 130 and 131. In this embodiment, each stitcher object will walk through the edit list searching for editing requests for its associated channel. By way of example, stitcher 147 will walk through edit list 108 to identify editing requests for channel 1, and likewise, stitcher 148 will walk through edit list 108 to identify editing requests for channel N, and so on. Once glue objects 130 and 131 are created, glue objects 130 will to provide each stitcher 147 and 148 with glue data that may have been generated during the first pass.

In this example, glue object 130 is charged with retrieving the various glue segments for the copied segment. By way of example, glue object 130 may retrieve glue data stored in A.MPEG glue file 126 and provide it to stitcher 147. Further, if any middle-glue data (i.e., un-processed portion of the copied segment) is required, glue object 130 will use pointers 134 to a streamer 122 controlled by control object 111. In this manner, glue object 130 will be able to retrieve the correct number of audio frames from the A.MPEG file 124. In this embodiment, middle-glue may be associated with audio frames lying between audio frame 61 and audio frame 66 in copied segment 60 of FIG. 1B. Of course, if glue segments are not generated for the audio frames, all of the audio frames beginning with the tab-in audio frame and ending with the tab-out audio frame will be identified as middle-glue.

Therefore, as each stitcher 147 and 148 requests glue data, glue objects 130 and 131 will retrieve the data from the appropriate location. As each stitcher receives requested data in a time ordered manner, each stitcher will transfer PES data streams to a MUX unit 150 that multiplexes the received PES data streams and sends a single audiovisual multiplexed stream to application 106 through MEDIT 102.

Figure 3:
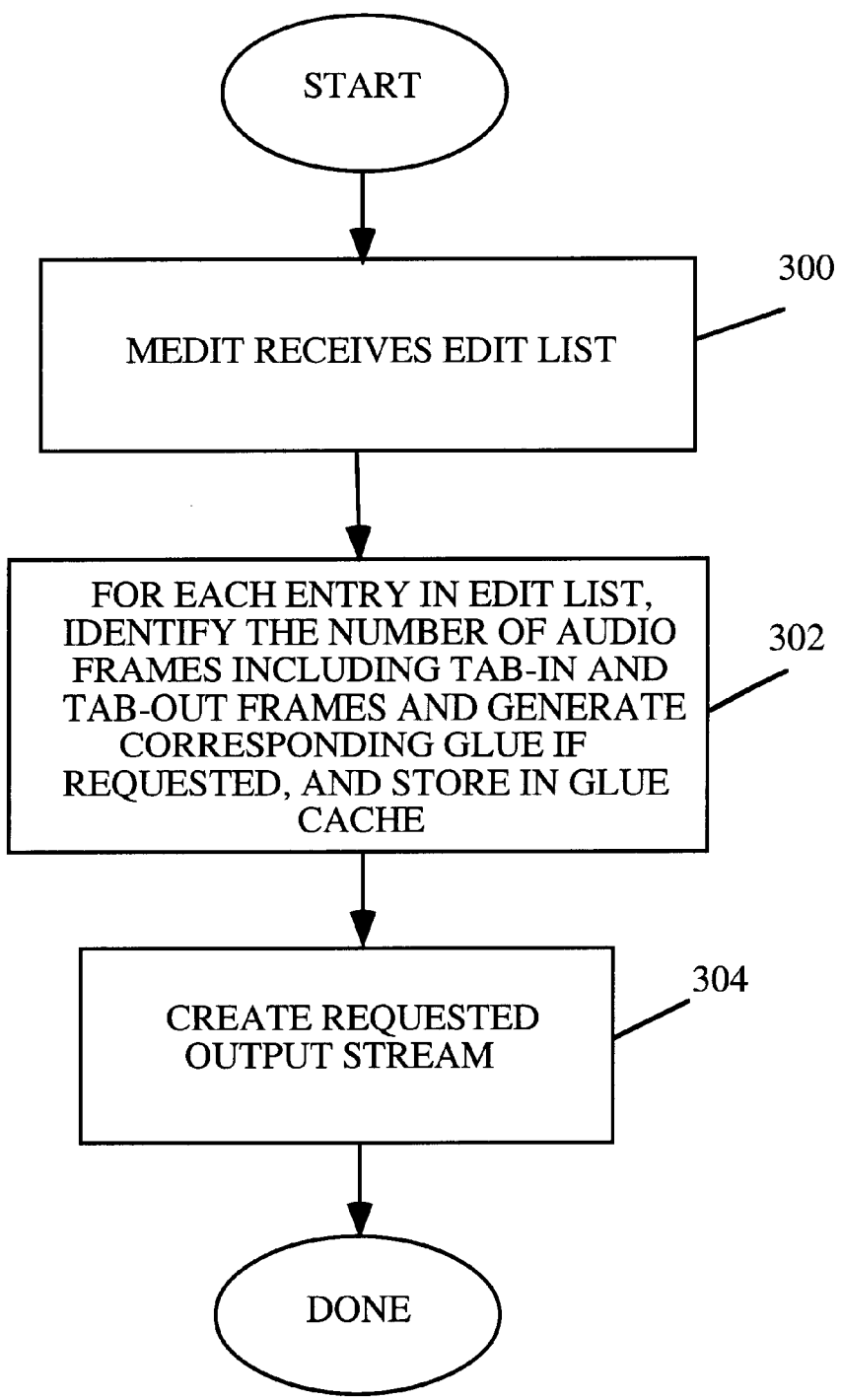
FIG. 3 is an overview flowchart identifying the preferred steps of editing audiovisual files in accordance with one embodiment of the present invention.

FIG. 3 is an overview flowchart identifying the preferred method steps for editing video files in accordance with one embodiment of the present invention. The method begins at a step 300 where MEDIT engine receives an edit list. As described above, an edit list will generally contain a number of channel operators that identify the number and type of channels required for a particular editing request. For example, there are typically separate channels for both audio as well as video. There may also be a number of separate video channels and a number of separate audio channels.

Referring to FIG. 2, once application 106 sends an edit list 108 to MEDIT engine 102, the method will proceed to a step 302 where the audio frames including the tab-in and tab-out frames are identified, and glue segments may be generated for each copy request in edit list 108 if requested. If glue segments are requested, there may be any number of glue segments for a particular copy operation in edit list 108. Thus, the audio glue segments may include in-glue, middle-glue (i.e., "un-processed" audio frames ) and an out-glue. If glue segments are generated for a predetermined number of audio frames, then the generated glue segments are preferably stored as "in or out" glue files for use in the second pass, and in future editing operations.

Thus, if the same range of frames is copied in a future editing operation, the previously generated glue segments may be re-used. Advantageously, this avoids having to inefficiently re-generate the same glue files from scratch. In fact, the glue segment files may be distributed throughout a network and be retrieved upon a requested editing operation.

Once the appropriate glue segments have been generated and stored to an appropriate memory location (e.g., cache memory), the method proceeds to a step 304 where the requested output stream is created during the second pass by the MEDIT engine 102 shown in FIG. 2. As shown, multiple stitcher objects are created such that each channel identified in the edit list will have its own stitcher object, and each stitcher object may walk through the edit list requesting data for each function operator in the edit list. Thus, each stitcher object will be responsible for pulling data from various audio glue files with the aid of a glue manager (i.e., glue objects 130 and 131). In this manner, each stitcher will receive data from the glue objects, and then a multiplexing unit 150 will request PES stream data from each stitcher.

As the multiplexer pulls data from the associated stitcher objects, the multiplexer also sends the multiplexed data to the application via the MEDIT engine 102. It should be understood that the stream output by the multiplexer may be audio, video or a multiplexed combination of video and audio data. Once the requested output stream has been sent to the application in step 304, the method is complete. FIGS. 4 through 17 will now be used to provide a more detailed description of the method steps associated with advantageously generating an edited output stream that maintains the audio component substantially synchronized with the video component.

Figure 4:
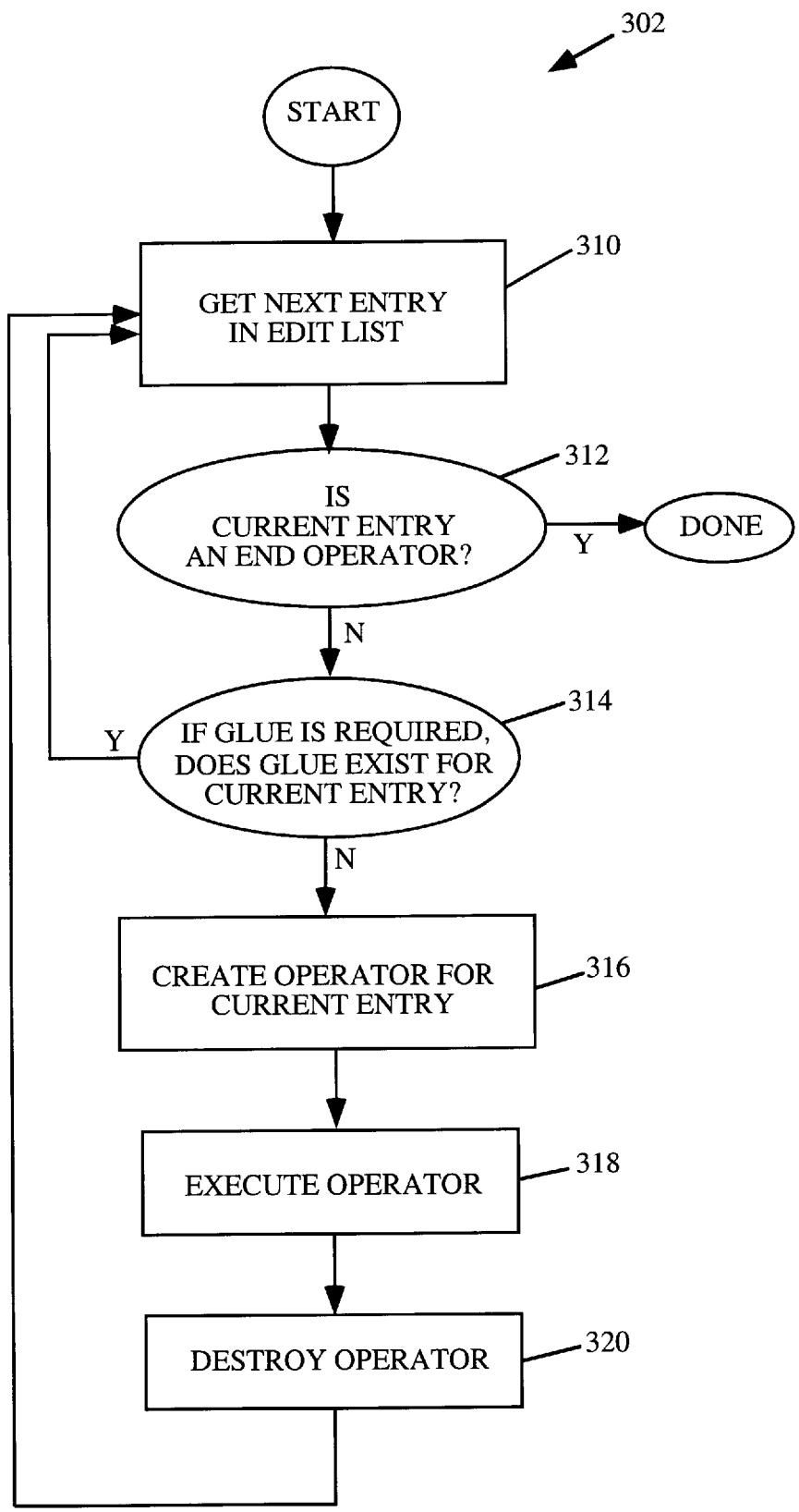
FIG. 4 is a flowchart illustrating a method of optionally generating glue segments for any suitable operator in accordance with one embodiment of the present invention.

FIG. 4 is a more detailed illustration of the method steps associated with generating glue for any suitable operator in accordance with one embodiment of the present invention. Initially, the MEDTF engine will walk through an edit list that may be provided by an application. Generally, the method begins at a step 310 where the MEDIT engine obtains the next entry in the edit list. Once the MEDIT engine has the current entry in the edit list, the method proceeds to a decision step 312. At decision step 312, it is determined whether the current entry in the edit list is an "END" operator. If the current entry is an END operator, the method of FIG. 4 will be done.

If the current entry is not an END operator, the method will proceed to a second decision step 314 where a determination is made as to whether glue exists, if glue is required for a current entry in the edit list. If required glue already exists for the current entry in the edit list, the method will proceed back to step 310 where the next entry in the edit list is processed as described above. On the other hand, if in step 314, it is determined that glue does not exist or is not required for the current entry, the method will proceed to a step 316 where an operator is created by MEDT for the current entry. Of course, the type of operator created will depend on the type of entry in the edit list. By way of example, if the entry is a copy request, then a "copy operator" will be created as described in FIG. 2.

It should therefore be appreciated that any suitable operator may be created by MEDIT depending on the type of editing request provided in an edit list. By way of example, suitable editing operators may include blend operators, fade operators, morphing operators, titling operators, and text annotation operators. Further, new operators may be created by MEDIT in the future depending on the type of "plug-in" operators installed by applications making use of the MEDMY editing engine of this invention.

Once the appropriate operator is created in step 316, the method will proceed to a step 318 where the operator is executed to generate appropriate audio segments and generate any requested glue segments for the particular type of function in the edit list. A more detailed description of the method steps associated with executing an operator is described with reference to FIG. 5. Once the appropriate audio segments and any glue segments are generated for the editing operation of step 318, the method proceeds to a step 320 where the operator is destroyed. Once the current operator is destroyed, the method will revert back to step 310, where the next entry in the edit list is received and again processed through to step 320 as described above.

Figure 5:
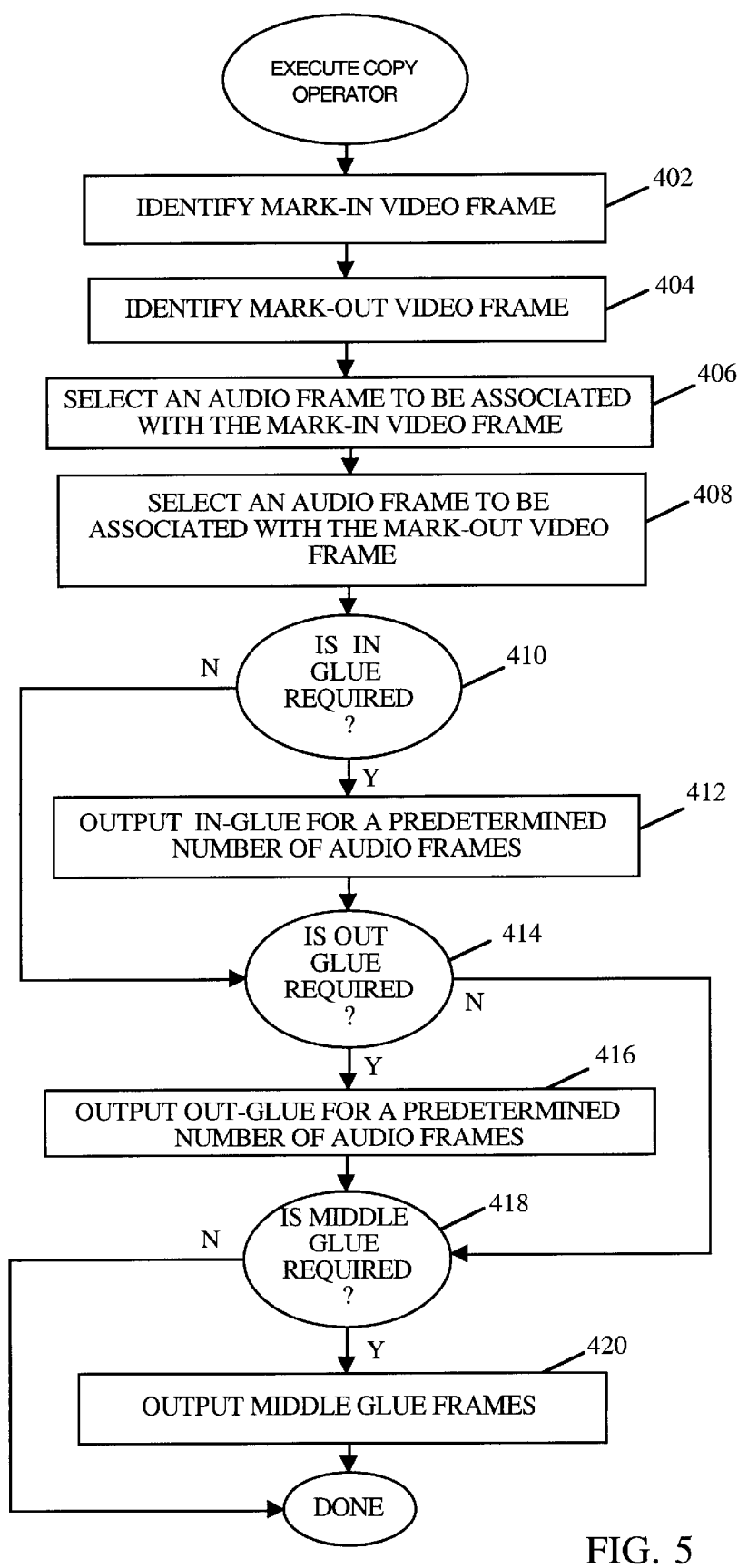
FIG. 5 is a flowchart illustrating the method steps associated with executing a copy operator in accordance with one embodiment of the present invention.

FIG. 5 is a more detailed description of the process steps associated with executing a copy operator in accordance with one embodiment of the present invention. The method begins at a step 402 where a mark-in video frame is identified. For ease of description, reference will be made to the exemplary display order stream 52 of FIG. 1A where the "mark-in" video frame is frame 9. Once the mark-in frame is identified, a mark-out frame is identified in a step 404. In this example, the mark-out frame is frame 28 as shown in FIG. 1A.

The method then proceeds to a step 406 where an audio frame is selected to be associated with the mark-in frame 9. In the example given, the selected audio frame will preferably be the tab-in audio frame. As described above, the tab-in audio frame will preferably have a start time that is before or at the start time of the mark-in video frame 9. The tab-in audio frame is therefore selected by performing an "audio-to-video" seeking operation that uses a known video start time (i.e., mark-in frame 9 start time) to perform a seek on the audio component. The audio seeker is therefore able to identify the presentation time stamps and the decode time stamps of the audio frames closest to mark-in frame 9. With this information, the seeker determines which audio frame has the closest start time to a start time 54 of the mark-in video frame 9.

As shown in FIG. 1B, audio frame 58 has a start time that is closer to start time 54. In this case, audio frame 58 is identified as the "mark-in audio frame" which has its own associated start time. At this point, the seeker will determine whether the start time of the mark-in audio frame 58 is at least as early (i.e., in time) as start time 54 of the mark-in video frame 9. In this example, the start time of the mark-in audio frame 58 is not at least as early as start time 54. Therefore, the seeker will back-up one audio frame to audio frame 56, which is now identified as the tab-in audio frame.

Once the audio frame associated with the mark-in video frame is selected, the method will proceed to a step 408 where an audio frame is selected to be associated with the mark-out video frame 28. As described above, an audio-to-video seek operation is again performed to identify a "mark-out audio frame". The mark-out audio frame will preferably be the audio frame that has a start time that is closest in time to the end time 53 of mark-out video frame 28. In this example, audio frame 64 has a start time that is closest to the end time 53 of mark-out video frame 28. Once the mark-out audio frame 64 is identified, the seeker will determine whether the mark-out audio frame 64 has a start time that is no later than the end time 53 of mark-out video frame 28. Since the exemplary mark-out audio frame 64 has a start time that is later than the end time 53 of the mark-out video frame 28, the seeker will back-up one frame to audio frame 62 which is now identified as the "tab-out" audio frame. Once the tab-in and tab-out audio frames have been selected in steps 406 and 408, the method proceeds to a decision step 410.

In step 410, the method determines whether an "in-glue" is required for the copied segment. As described above, glue segments are generally identified as decoded and re-encoded audio frames. In this embodiment, a predetermined number of audio frame may be decoded and re-encoded at the beginning of the copied segment. By way of example, although any number of audio frame may be decoded and re-encoded to introduce sound blending effects, fading effects, etc., audio frames 56, 58, 59 and 61 may be decoded and re-encoded based on an implicit requirement of the copy operator 104 of FIG. 2. On the other hand, the number of glue audio frames and the type of sound effects may be requested explicitly through application 106 of FIG. 2.

If in-glue is required in step 410, the method will proceed to a step 412 where in-glue is output for a predetermined number of audio frames beginning with the tab-in audio frame. On the other hand, if in-glue is not required, the method will proceed to a step 414 where it is determined whether "out-glue" is required. If out-glue is required, the method will proceed to a step 416 where out-glue (i.e., decoded and re-encoded audio frames) is output for a predetermined number of frames. As in the case of in-glue, an exemplary predetermined number of frames may be audio frames 66, 65, 63, and 62 of FIG. 1B. On the other hand, if out-glue is not required in step 414, the method will proceed to a step 418 where it is determined whether middle-glue is required for the copy operation. If middle glue is required for the copy operation in step 418, the method will proceed to a step 420 where a middle-glue segment of audio frames is output.

In one embodiment, a middle-glue audio segment may include: (a) audio frames beginning with the tab-in frame and ending at the tab-out frame; (b) audio frames between the tab-in frame and extending to one frame before the first out-glue audio frame; (c) audio frames beginning with an audio frame after the last in-glue frame and extending to the tab-out frame; or (d) audio frames beginning with an audio frame after the last in-glue frame and extending to one frame before the first out-glue audio frame. Once the appropriate optional glue segments are output, the method of executing the copy operator is done.

Figure 6:
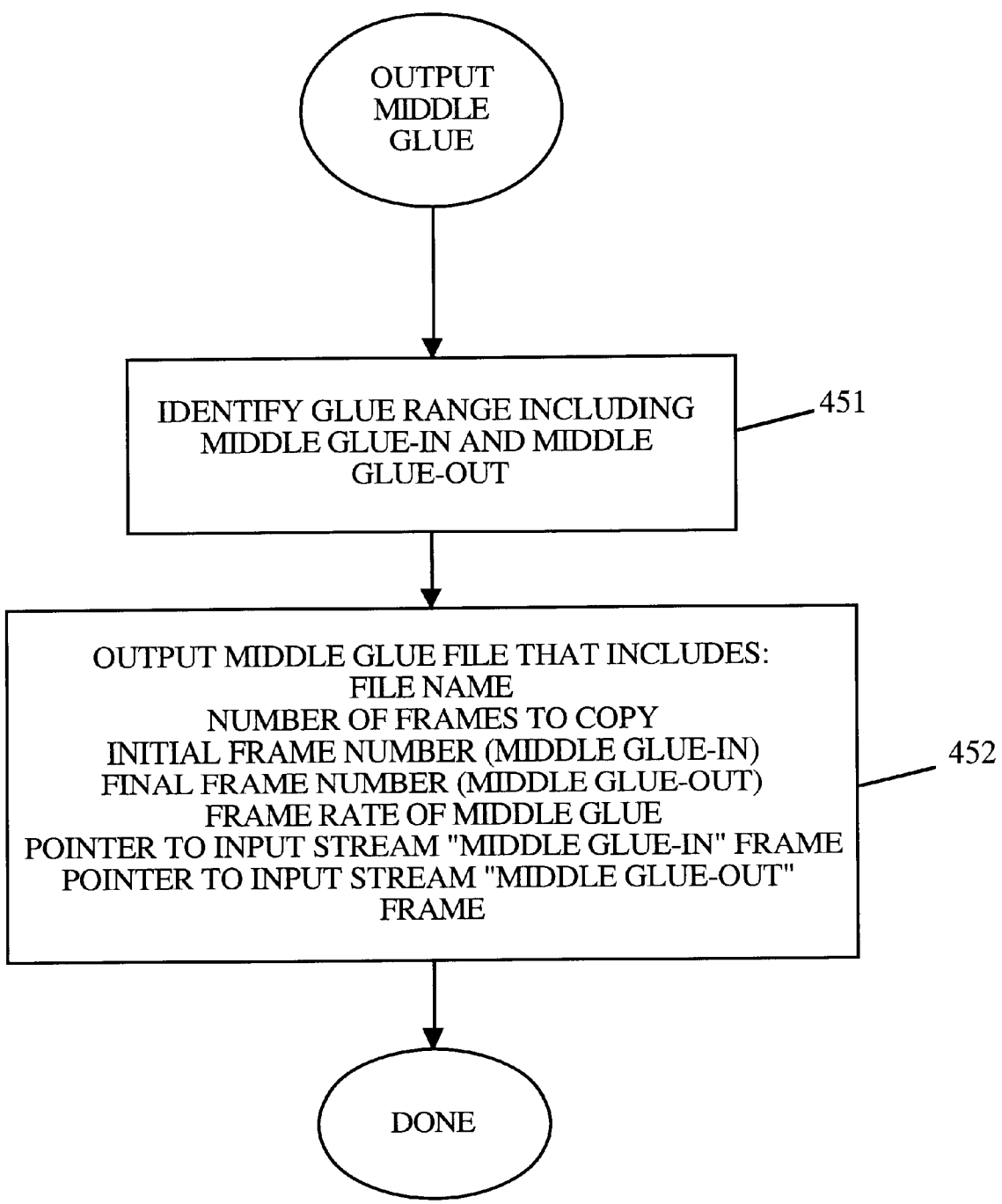
FIG. 6 is a flowchart illustrating the method steps associated with outputting a middle-glue of FIG. 5 in accordance with one embodiment of the present invention.

FIG. 6 is a flowchart diagram illustrating the method steps associated with outputting a middle-glue as described in FIG. 5. The method begins at a step 451 where the glue range is identified. As described above, the middle-glue range may vary depending on whether in-glue and out-glue is required. For exemplary purposes, assuming that in-glue for audio frames 56, 58, 59, and 61, and out-glue for audio frames 66, 65, 63, and 62 are required, the middle-glue segment may be identified as extending from an audio frame 69 to an audio frame 68. Of course, if no "in or out" glue is required, the middle-glue segment may extend from tab-in frame 56 to tab-out frame 62.

Once the middle-glue range is identified in step 451, the method will proceed to a step 452 where a middle-glue file is output that includes a number of identifiers. By way of example, the output file will preferably have a file name, the number of audio frames associated with the middle-glue segment, the initial audio frame number (middle-glue-in), the final audio frame number (middle-glue-out), the audio frame rate of the middle-glue, pointers to an input stream identifying the "middle-glue-in" frame, and pointers to the input stream identifying the "middle-glue-out" frame. In one embodiment, the middle-glue audio frames maybe un-processed audio frames 69 through 68 (e.g., not decoded and re-encoded) that are "copied" from an input file when the stitcher calls for the middle-glue segment in the second pass. Once the middle-glue output file has been generated in step 452, the method of generating middle-glue will be done.

Figure 7:
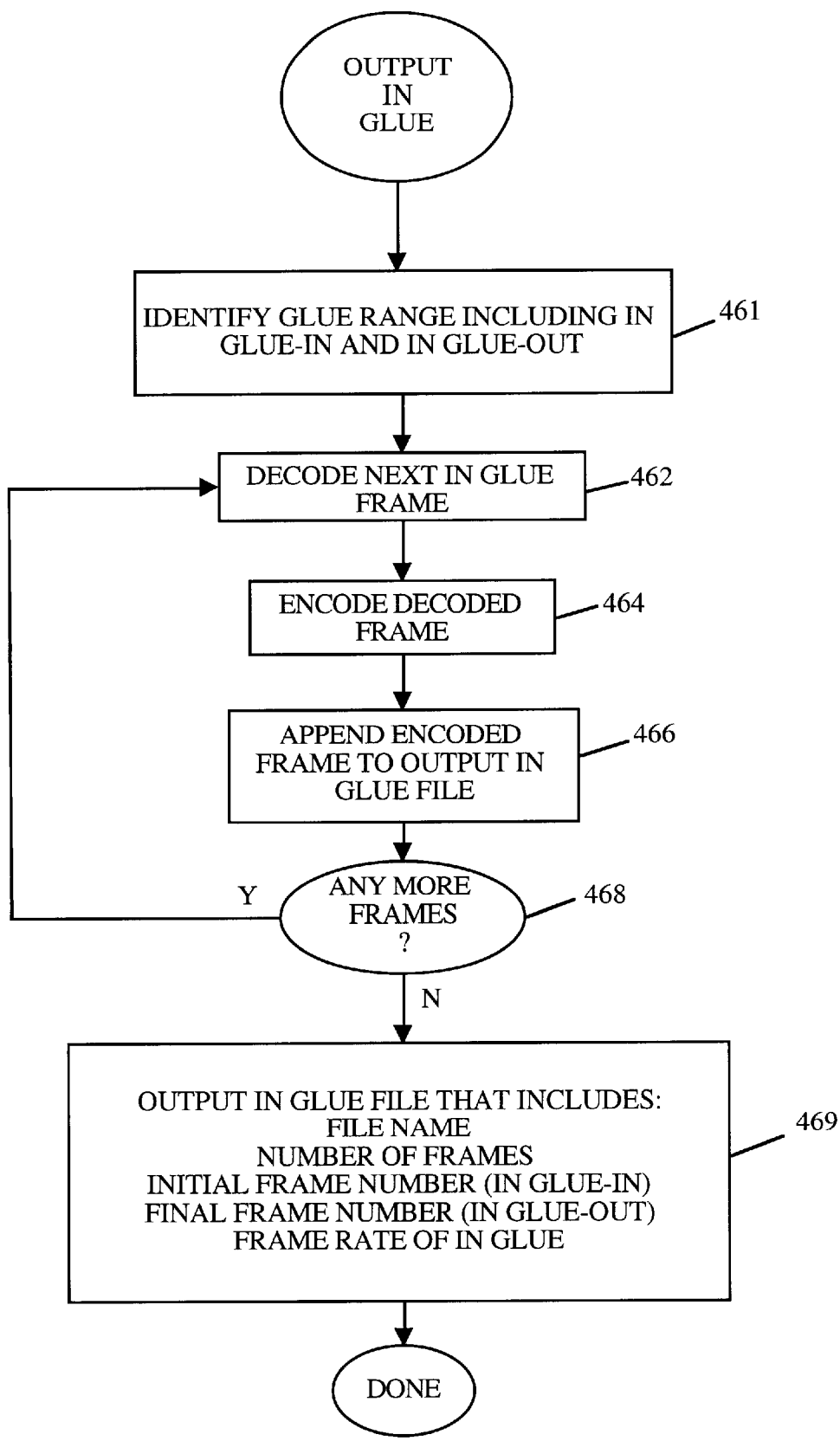
FIG. 7 is a flowchart illustrating the method steps associated with outputting an in-glue of FIG. 5 in accordance with one embodiment of the present invention.

FIG. 7 is a flowchart diagram describing the method steps associated with outputting an in-glue as described in FIG. 5.

The method begins at a step 461 where the glue range is identified for the segment of in-glue which includes an "in-glue-in" frame and extends to an "in-glue-out" frame. By way of example, with reference to audiovisual segment 60 of FIG. 1B, the in-glue segment will preferably include audio frames 56 through 61.

Once the glue range for the in-glue has been identified in step 461, the method proceeds to a step 462 where the first in-glue frame is decoded. By w ay of example, the first frame that will be decoded is preferably tab-in audio frame 56. Referring to the data flow architecture of FIG. 2, once frame 56 has been selected from A.MPEG file 124 by an appropriate seek engine 118 of control object 111, the identified data (i.e., tab-in audio frame 56) is retrieved and demultiplexed by a DEMUX unit 121 which isolates the audio bit stream from the video bit stream. Thereafter, tab-in audio frame 56 is sent to decoder 120 where the audio sample data is decoded. The decoded sample data is then sent to copy operator 104 which then sends the data to encoder 114. At this point, the method proceeds to a step 464 where tab-in audio frame 56 is by encoder 114 lying within control object 113.

In this embodiment, frame 56 is may be re-encoded to smooth in a transition between audio segments being stitched together (e.g., to substantially remove popping effects). As described above, the re-encoded audio frames may be encoded to include, e.g., a fade to zero or from zero for half a second, adding a 60 Hz "humm", etc. Once frame 56 has been encoded, the method proceeds to a step 466 where the encoded frame is appended to the output in-glue file (i.e., A.MPEG GLUE 126) by glue object 116.

The method now proceeds to a decision step 468 where it is determined whether there are anymore audio frames in the in-glue range of frames identified in step 461. If there are more audio frames, the method will again proceed to a step 462 where the next frame in the in-glue segment is decoded as described above. Once the next frame is decoded in step 462, the method will again proceed to step 464 where the frame may be encoded with any number of continuity producing sound effects. Therefore, once the frame has been encoded, the method will proceed to a step 466 where it is again appended to the output glue file. The method then proceeds to step 468 where it is again determined whether there are anymore audio frames in the in-glue range of frames identified in step 461.

If there are no more frames in the in-glue range of frames identified in step 461, the method will proceed to a step 469 where an in-glue file that includes the appended frames is output (e.g., A.MPEG glue file 126). By way of example, the glue file may include a file name, the number of frames in the in-glue segment, the initial frame number for the ("in-glue-in") frame, the final frame number for the ("in-glue-out") frame, and the audio frame rate of the in-glue segment. Once the output glue file is complete, the method is done for the method steps associated with outputting an inglue as described in FIG. 5.

Figure 8:
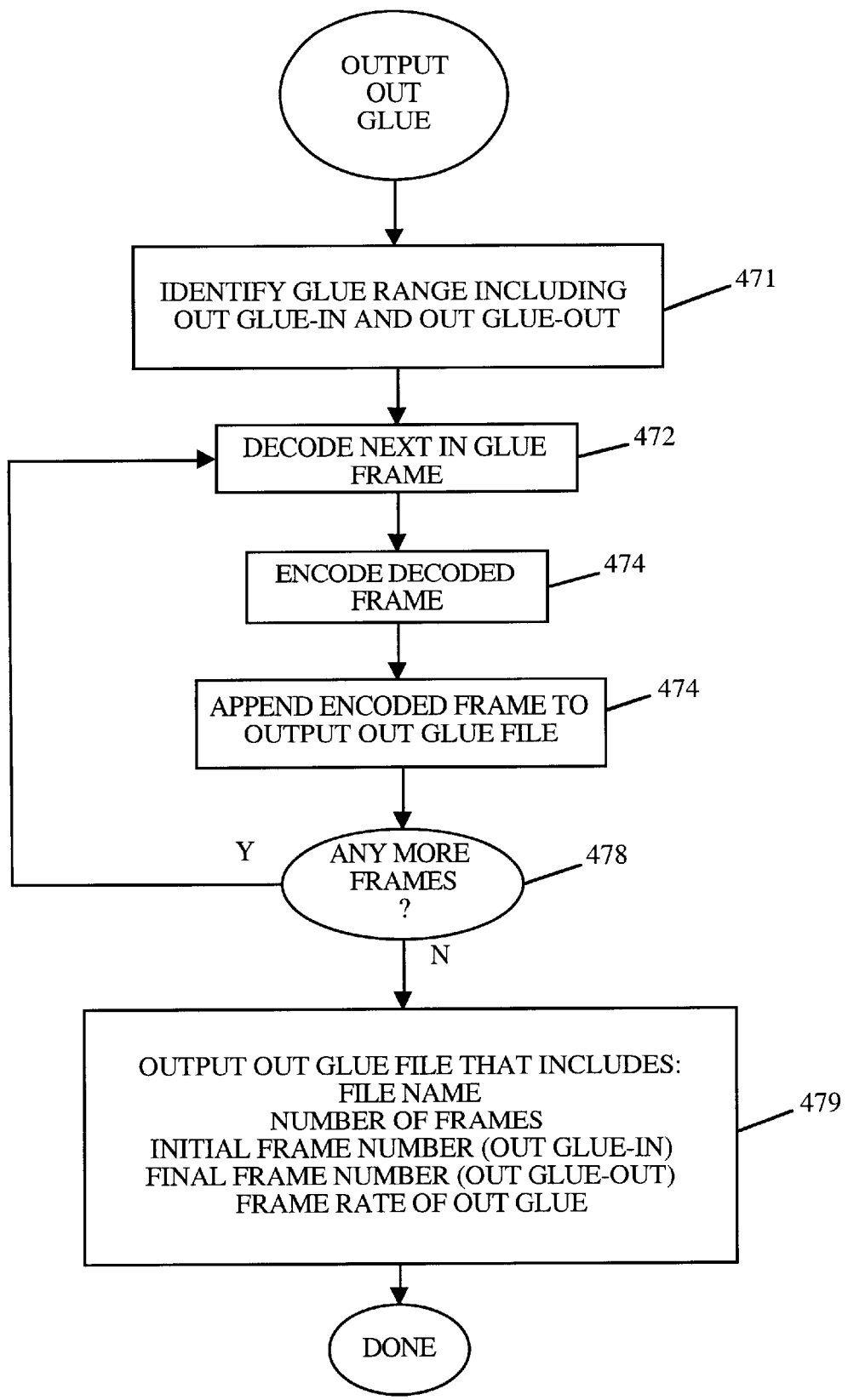
FIG. 8 is a flowchart illustrating the method steps associated with outputting an out-glue of FIG. 5 in accordance with one embodiment of the present invention.

FIG. 8 is a flowchart diagram illustrating the method steps associated with outputting an out-glue as described in FIG. 5. The method begins at a step 471 where the glue range is calculated for the out-glue segment. By way of example, in audiovisual stream 60 of FIG. 1B, the out-glue segment may begin at audio frame 66 and extend to tab-out audio frame 62. Once the out-glue range has been calculated in step 471, the method will proceed to a step 472 where audio frame 66 in the out-glue segment is decoded.

With reference to the data flow architecture of FIG. 2, once seek engine 118 has located and retrieved audio frame 66 in a file such as A.MPEG file 124, the audio frame data is demultiplexed in DEMUX 121 to isolate the audio component. Frame 66 is then decoded in DEC 120 which generates decoded audio sample data from within control object 111. The decoded sample data is then sent to copy operator 104 which sends the data to encoder 114 of control object 113. Once the data has been re-encoded by encoder 114 in a step 474, glue object 116 will append the re-encoded audio frame to a glue file (e.g., A.MPEG GLUE file 126) in a step 476.

The method will then proceed to a step 478 where it is determined whether there are anymore frames in the glue-out range. Since there are more frames in the glue-out range, the method will proceed back again to step 472 where the next frame is processed. By way of example, the next frame may be audio frame 65 which is decoded and then re-encoded in step 474. As described above, frame 66 is then re-encoded into a suitable encoding format to produce a desired sound effect. Once the frame is encoded in step 474, the method will proceed to step 476 where the re-encoded frame is appended to the out-glue file as described above.

The method will then continue to loop back to step 472 until all audio frames in the predetermined out-glue segment are processed in accordance with one embodiment of the present invention. When it is determined that there are no more frames for processing into out-glue in step 478, the method will proceed to a step 479 where an output glue file is generated. By way of example, the glue file may include a file name, the number of frames in the out-glue segment, the initial frame number for the ("out-glue-in") file, the final frame number for the ("out-glue-out") file, and the frame rate of the out-glue segment. Once the output glue file is complete, the method is done for the process steps associated with optionally outputting an out-glue as described in FIG. 5.

Figure 9:
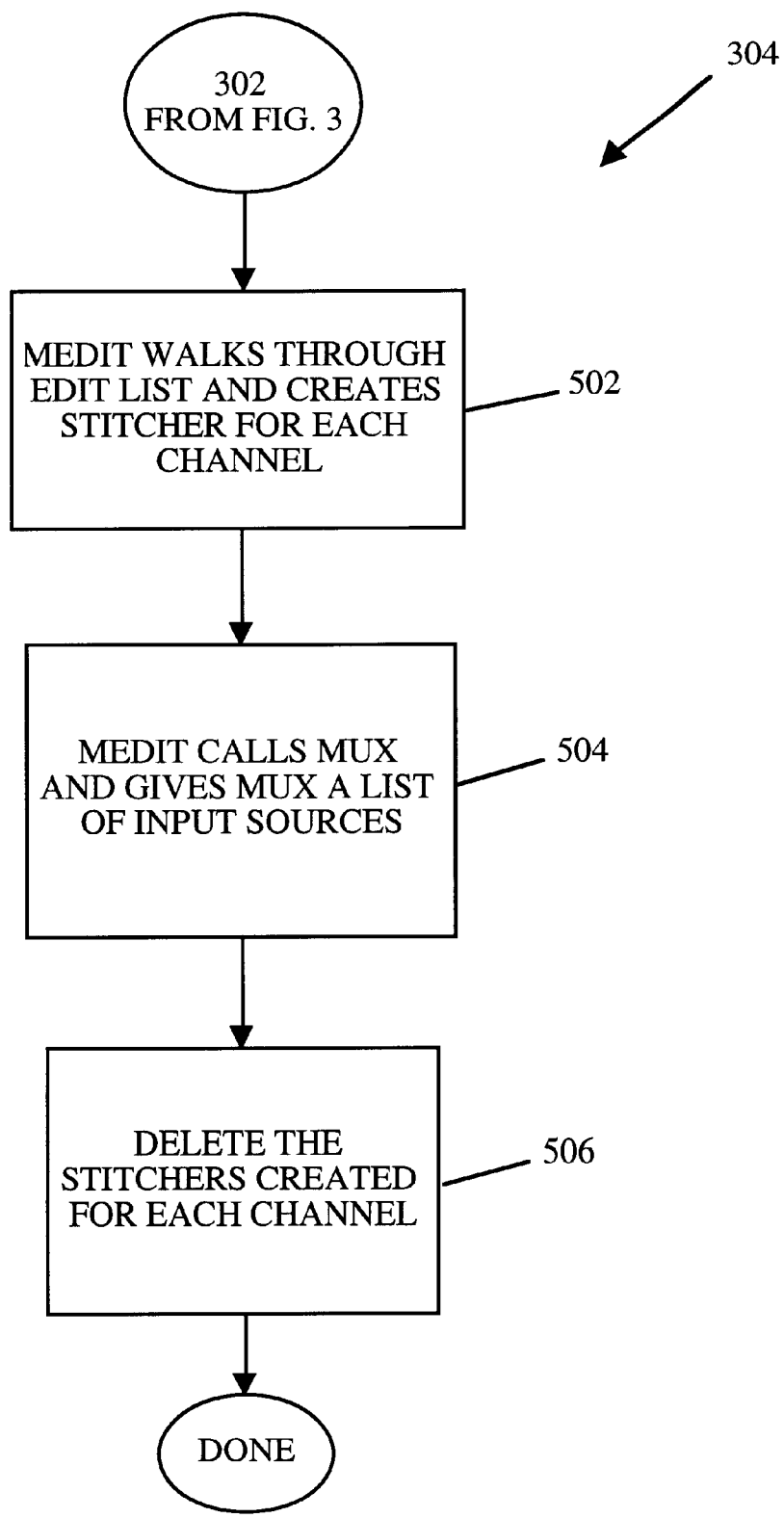
FIG. 9 is an overview flowchart of the method steps associated with creating the requested output stream during a second pass of an editing operation in accordance with one embodiment of the present invention.

FIG. 9 is an overview flowchart of the method steps associated with creating the requested output stream during the second pass performed by MEDIT engine 102 as described in step 304 of FIG. 3. The method begins at a step 502 where MEDIT walks through an edit list and creates stitcher objects for each channel in the edit list. By way of example, an edit list may have numerous channels for displaying different video files. As shown in FIG. 2, exemplary channel operators 110 are identified for a channel 1 and extending to a channel N. Thus, associated stitcher objects are created for channel 1 and channel N, and are shown as stitcher object 147 and stitcher object 148, respectively.

Once the stitcher objects have been created for each channel identified in the edit list in step 502, the method will proceed to a step 504 where MEDIT calls a multiplexer 150 and gives the multiplexer a list of input sources. In this embodiment, multiplexor 150 is configured to pull data from input sources such as stitcher object 147 and stitcher object 148. However, it should be understood that multiplexor 150 may pull data from any number of suitable input sources other than stitcher objects 147 and 148. By way of example, the input sources may be embodied in any suitable form such as a file containing appropriate MPEG data.

The method then proceeds to a step 506 where the stitcher objects created for each channel are deleted once the stitcher objects have provided multiplexor 150 with appropriate input data from the un-processed input stream and the various glue files that may have been generated during the first pass as described above. After multiplexer 150 generates the requested copied segment, the copied segment is sent to the application through MEDIT engine 102. Once the copied segments are output, the stitcher objects are deleted in step 506, and the second pass is done.

Figure 10:
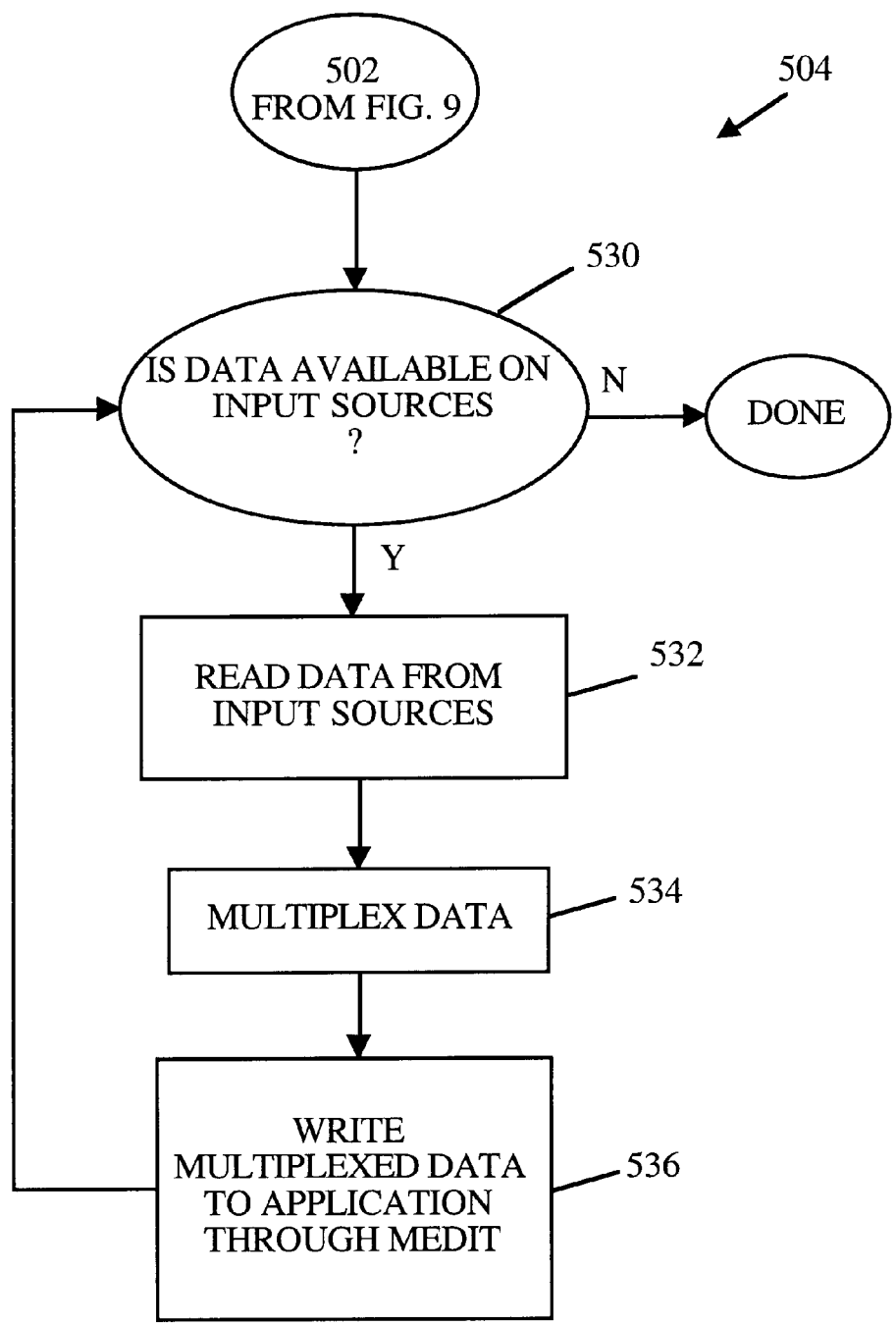
FIG. 10 is a more detailed description of the method steps associated with multiplexing data pulled from input sources in accordance with one embodiment of the present invention.

FIG. 10 is a more detailed description of the method steps associated with multiplexing data pulled from input sources as described in step 504 of FIG. 9. At a first step 530, the method determines whether data is available on any input sources provided to the multiplexor. If the multiplexer is not provided with any input sources, the multiplexer will be done. On the other hand, if there are input sources provided to the multiplexer, the method will proceed to a step 532 where data provided by the input sources is read by the multiplexer.

Once any available data has been read from the input sources in step 532, the method will proceed to a step 534 where the read data is multiplexed by a suitable multiplexing engine. By way of example, a suitable public domain multiplexing engine may be a one or two pass MPEG multiplexing engine, file name MPEG-1: Multi-Stream System Layer Encoder (multiplexer), developed by Z. Yaar, J. Boucher, J. Palmer, and E. Rubin (public domain, 1994). These multiplexing engines are available from Boston University, of Boston, Mass.

Once the data has been multiplexed in step 534, the method will proceed to a step 536 where the multiplexed data is read to MEDIT engine 102 and then sent to the application requesting the editing operation as described in FIG. 2. Once the multiplexed data is written to MEDIT, the process again proceed to decision step 530 where it is determined whether there are anymore available input sources. If there are available sources, the method will again loop through steps 532, 534, and 536 until there are no more input sources. Once there are no more input sources, the method will be done.

Figure 11:
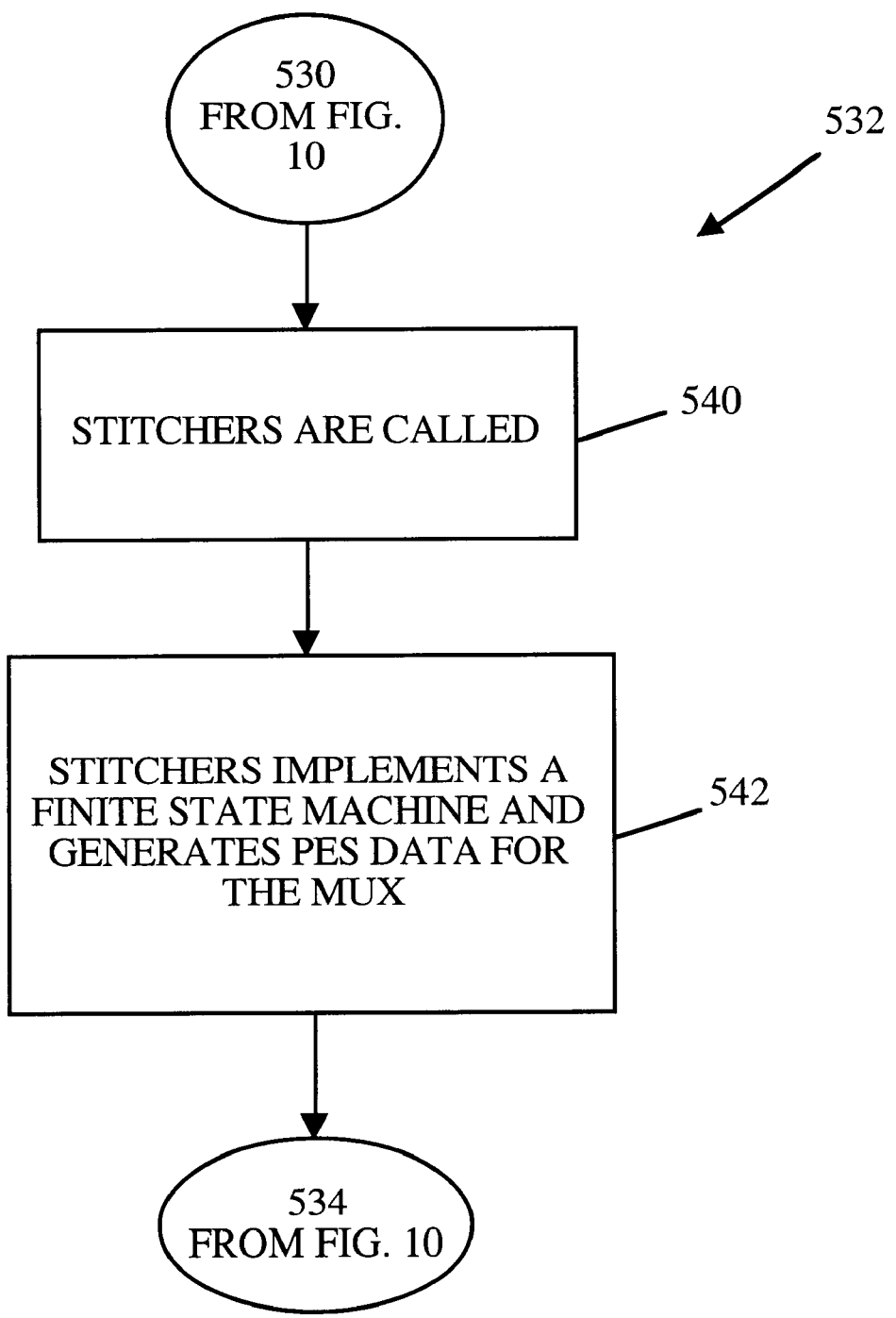
FIG. 11 is a general description of the method steps performed by stitcher objects in accordance with one embodiment of the present invention.

FIG. 11 is a more detailed description of the method steps performed by the stitcher objects when reading data from input sources as described in step 532. Initially, the method begins at a step 540 where the stitcher objects are called by the MEDIT engine 102. As described above, a stitcher is preferably created for each channel (i.e., for all audio and video channels) provided in an edit list. Once the appropriate number of stitcher objects have been created, the method will proceed to a step 542 where each stitcher implements a finite state machine in order to generate an appropriate program elementary stream (PES) for the multiplexer.

In general, the finite state machine is charged with opening the input sources, reading the input sources, and closing the input sources in a time ordered manner. Thus, each stitcher will preferably walk through the state machine attempting to open the various input sources and attempting read the appropriate audio data. Once the data is read, the files are closed. If no data is found in the input sources (i.e., no "in, middle or out" glue was generated or needed), the state machine will proceed to the next file and proceed performing open, read, and close operations.

As described above, each of the stitchers use a glue object such as glue objects 130 and 131 to retrieve the glue files when requested. Therefore, each glue object is charged with retrieving the various pieces of glue files that may have been generated during the first pass as described in step 302 of FIG. 3. Advantageously, by implementing glue objects, it is irrelevant to each stitcher object where the glue file is actually stored since the glue objects will retrieve the glue files from the appropriate location when requested by each stitcher. In this manner, each stitcher will loop through asking its associated glue object for glue files until there are no more glue files available for a particular copy operation.

Figure 12:
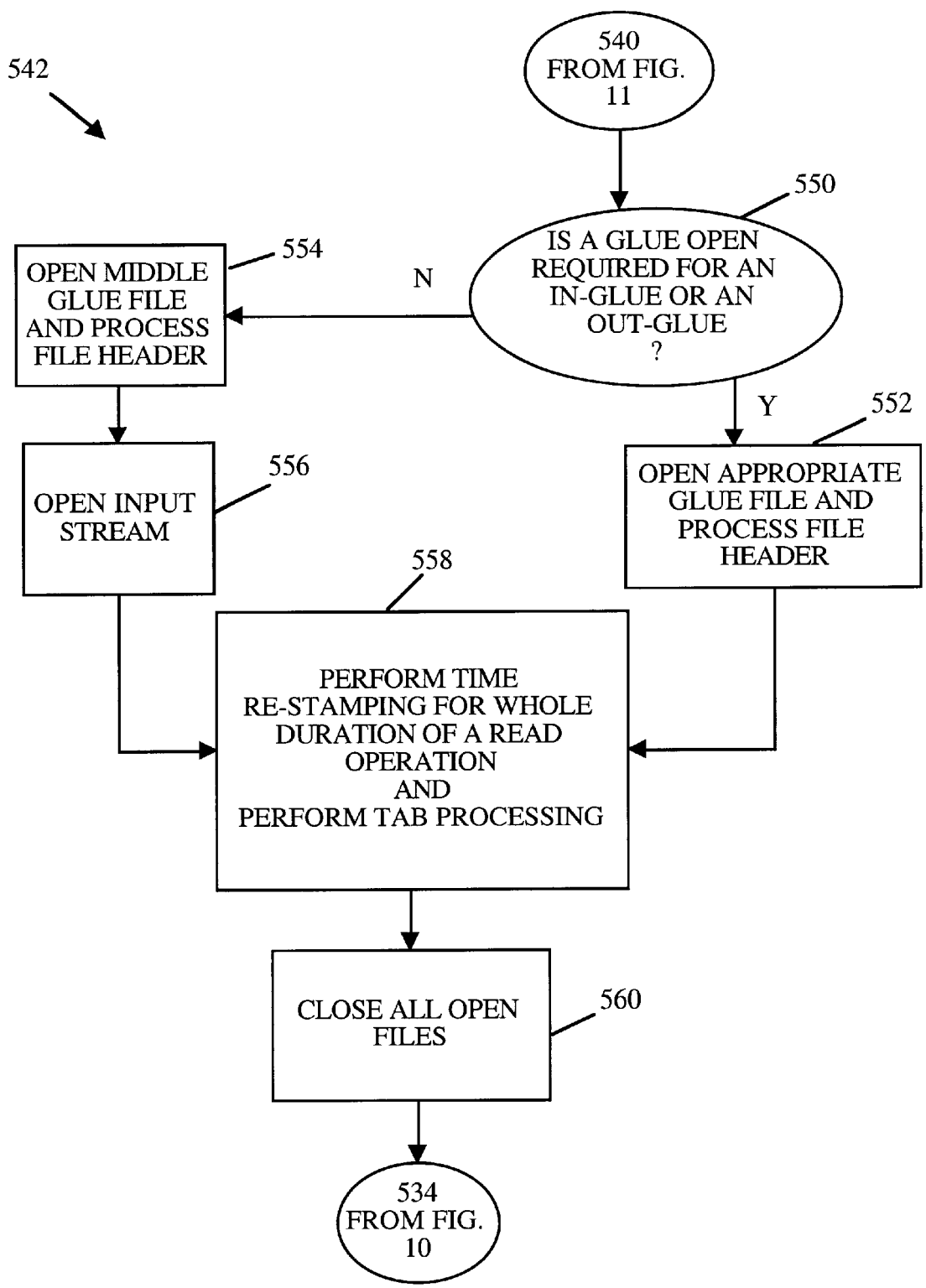
FIG. 12 is a more detailed description of the method steps performed by stitcher objects in accordance with one embodiment of the present invention.

FIG. 12 is a more detailed description of the method steps performed by each stitcher when implementing the finite state machine as described in step 542 of FIG. 11. The method begins at a step 550 where it is first determined whether an "open" is required for an in-glue or an out-glue. If an open is required for an in-glue or an outglue, the method will proceed to a step 552 where the appropriate glue file is opened and the file header is processed as is well known in the art.

Once the file headers are processed, the method will proceed to a step 558 where a time re-stamping is performed for the opened glue file for the whole duration of a read operation. Also performed in step 558 is a tab processing operation. In general, during a read operation, the data is read into a buffer where the data is temporally held. Once in the buffer, the read contents are processed from beginning to end to determine appropriate time re-stamping, and to determine whether to drop or retain the tab-in and tab-out audio frames for the copied audio frame segments. Once processed, the entire contents of the buffer are output to the multiplexer (e.g., MUX 150 of FIG. 2).

As will be described in greater detail with reference to FIG. 13, tab processing is generally performed to assure that no more than about half an audio frame error is produced once two or more audio and video segments are joined. Broadly speaking, tab processing is performed at each of the tab-in and tab-out audio frames, and if certain conditions are met, the tab-in and tab-out audio frames may be dropped or retained.

Once re-stamping and tab processing has been performed in step 558, the method will proceed to a step 560 where the state machine closes the open files. On the other hand, if an open was not required for an in-glue or an out-glue, the method will proceed to a step 554 where an open-middle-glue file and process file header step is performed. In this step, the headers of the middle-glue file are processed to assure that MPEG stream standards are met. Next, the method will proceed to a step 556 where the middle-glue file is open with reference to pointers indicating the location of the middle-glue. By way of example, as shown in FIG. 2, pointers 134 and 136 will identify the location of the beginning and ending audio frames in the input stream from which reading will be performed. Once the input stream has been opened in 556, the method will again proceed to step 558 where time re-stamping and tab processing is performed as described above. Once time re-stamping and tab processing is performed, the method will proceed to step 560 where the open files are closed.

Figure 13:
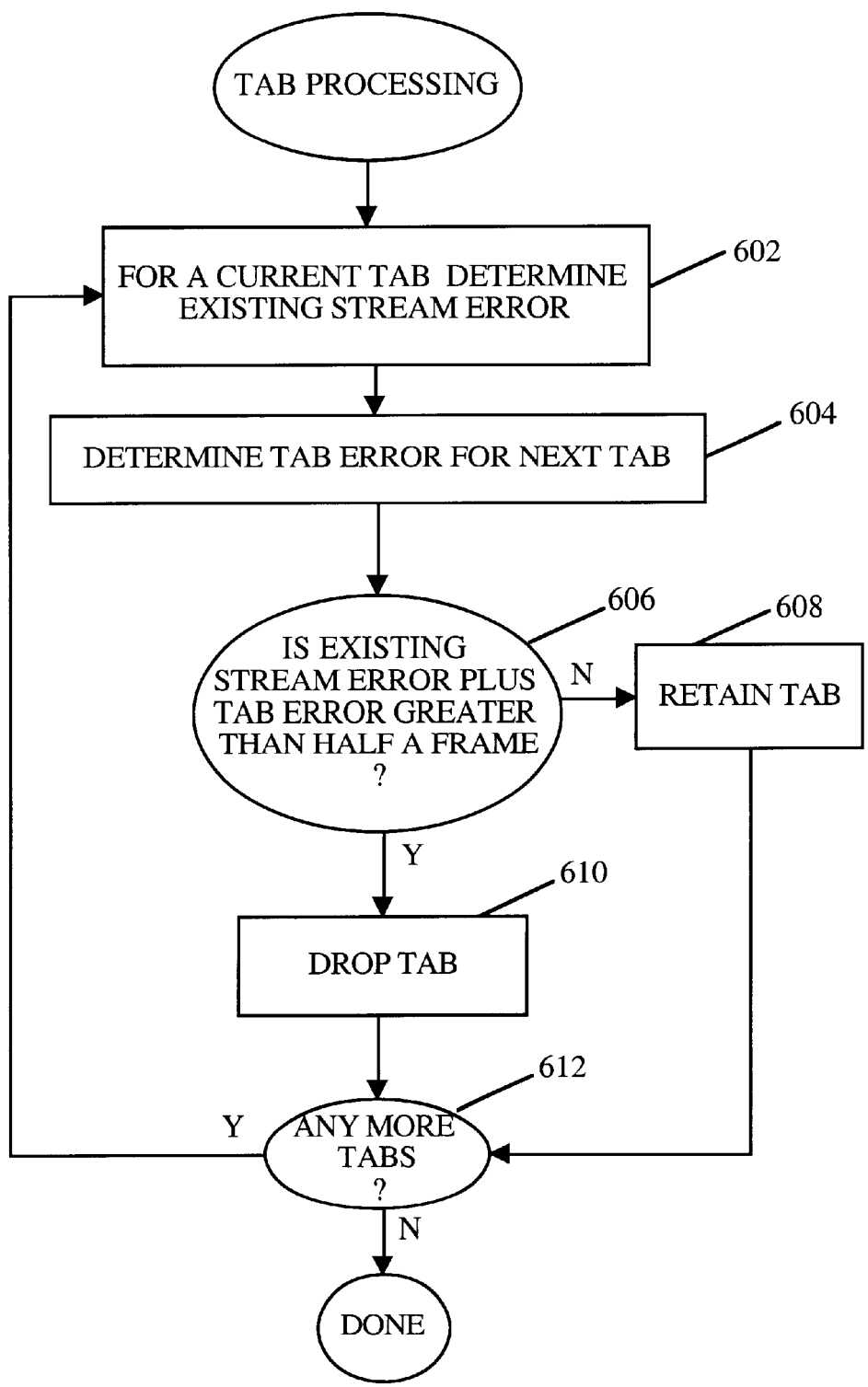
FIG. 13 is a flowchart illustrating the method steps associated with processing tabs in accordance with one embodiment of the present invention.

FIG. 13 is a flowchart diagram illustrating the method steps associated with performing tab processing in accordance with one embodiment of the present invention. For ease of illustration, concurrent reference will be made to FIG. 14 which illustrates a plurality of audiovisual segments that will be stitched together, and FIG. 15 which shows a tabulation table for an exemplary tab processing operation.

Figure 14:
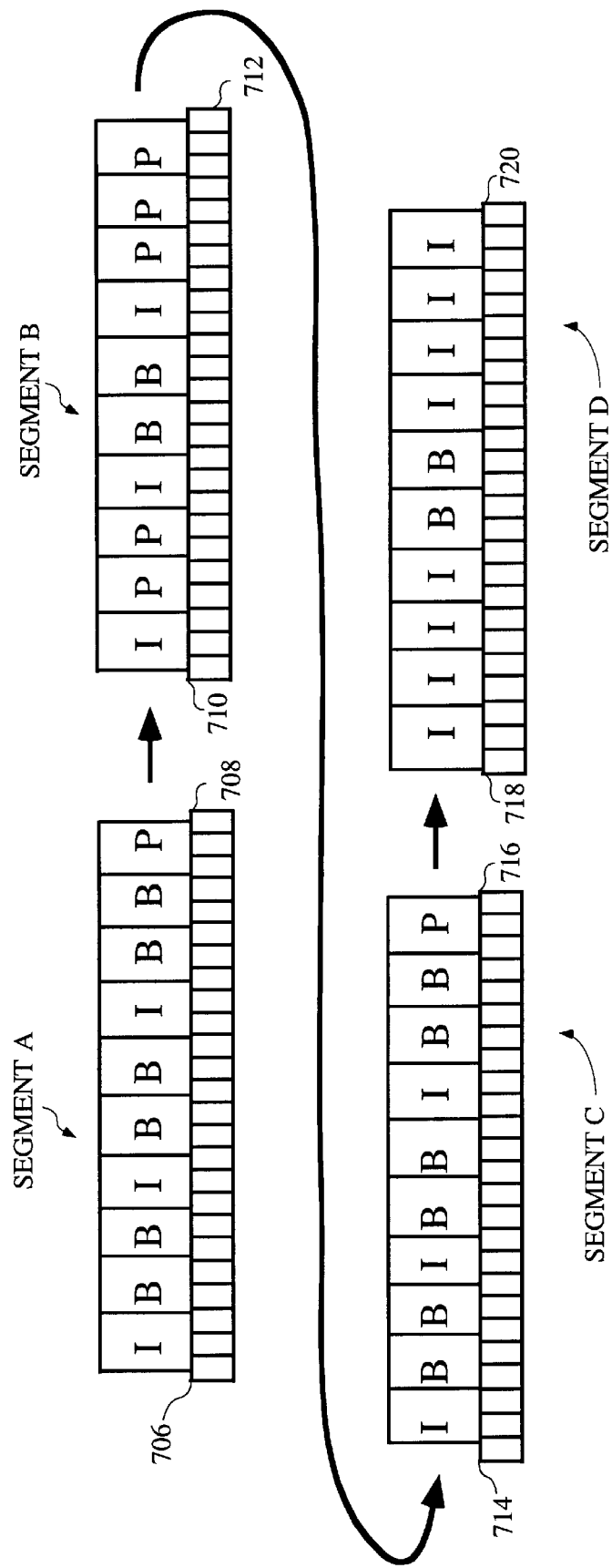
FIG. 14 is a diagrammatic illustration of a plurality of audiovisual segments being stitched together in accordance with one embodiment of the present invention.
Figures 15, 16:
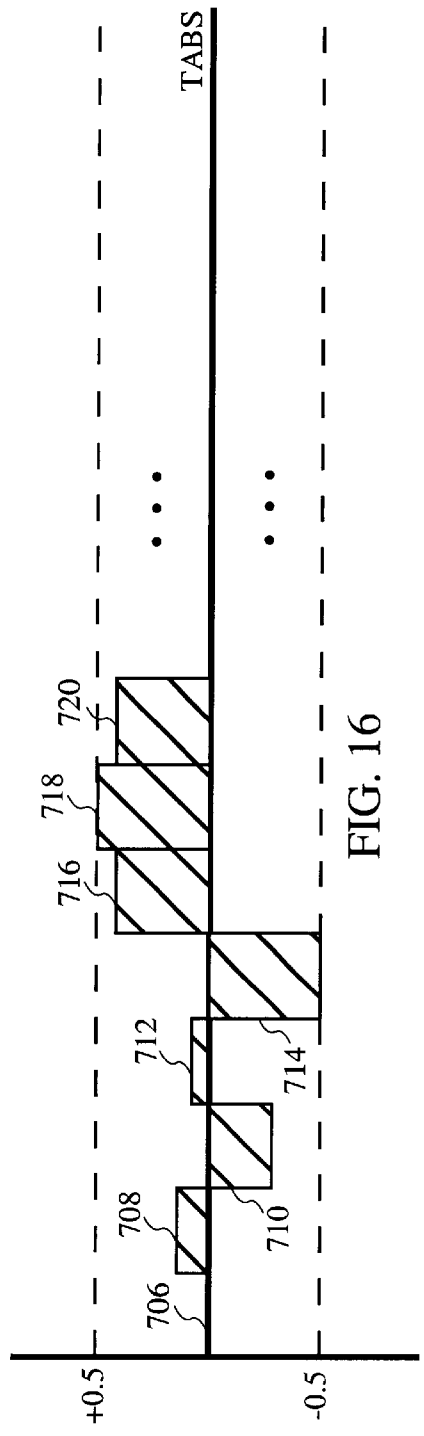
FIG. 15 shows a table illustrating a plurality of tab processing calculations in accordance with one embodiment of the present invention.
FIG. 16 is a diagram illustrating the audio frame errors after tabs are processed in accordance with one embodiment of the present invention.

The method in FIG. 13 beings at a step 602 where a current tab 706 is processed and the existing stream error is determined. As shown in FIG. 14, the first segment is SEGMENT A, and the existing stream error is zero. For example, since there are no prior tabs carrying forward an existing stream error, and SEGMENT A is the first segment, the existing stream error is zero. Once the existing stream error is determined to be zero in step 602, the method proceeds to a step 604 where the tab error is determined for tab 706. In this example, the tab error is 0.2 as shown in the table of FIG. 15. As used herein, reference to an "error"

means the percentage an of an audio frame for which an audio frame is un-synchronized with the associated video frames. By way of example, a 0.2 error shall mean 20% of an audio frame. Further, although round numbers are used for ease of description, an associated error may have any suitable precision.

Once the error for tab 706 is determined in step 604, the method proceeds to a step 606 where it is determined whether the sum of the existing stream error and the tab error (i.e., cumulative error) is greater than half a frame (i.e., >0.5 error). In this example, the sum of the existing error (0.0 error) and tab 706 error (0.2) is not greater than half a frame. When the error is not greater than half a frame, the method proceeds to a step 608 where tab 706 is retained as shown in the table of FIG. 15. The method now proceeds to a decision step 612 where it is determined whether there are any more tabs in the stitching operation illustrated in FIG. 14. Since there are, the method will return to step 602 where the existing stream error is determined for the current tab. As shown in FIG. 14, the current tab is now tab 708. At this stage, the existing stream error is the error carried from a previous tab processing operation.

As shown in the table of FIG. 15, the existing stream error is now 0.2. Once the current stream error is determined in step 602, the method will proceed to a step 604 where the tab error for tab 708 is determined. As shown in the table of FIG. 15, the tab error for tab 708 is 0.5. The method now proceeds to the decision step 606 where it is determined whether the sum of the existing stream error (0.2) and the tab error for tab 708 (0.5) is greater than half a frame. Since the sum of errors is 0.7 (i.e., >0.5), the method will proceed to a step 610 where tab 708 is dropped. After tab 708 is dropped, the new stream error will be −0.3 as shown in FIG. 15.

Once tab 708 which represents the tab-out for SEGMENT A is processed, the method will again proceed to step 612 where it is determined whether there are any more tabs to process. Since there are, the method will return to step 602 where the current tab is tab-in 710 of SEGMENT B. Since the new stream error was −0.3 after the last tab was processed, the existing stream error will be −0.3 when tab 710 is processed. The method will now proceed to step 604 where the tab error for tab-in 710 is determined to be 0.4 as shown in the table of FIG. 15.

The method then proceeds to decision step 606 where it is determined whether the sum of the existing stream error and the tab error for tab 710 is greater than half an audio frame. In this example, the sum is (−0.3+0.4) 0.1, which is less than half an audio frame (i.e., <0.5). Therefore, tab 710 will be retained as illustrated in FIG. 15. The method again continues to decision step 612 where it is again determined whether there are any more tabs. As shown in FIG. 14, tabs 712, 714, 716 and 720 will also be process through the method steps of FIG. 13 as described above. Once each tab is processed, a determination will be made to either drop or retain each tab. For completeness, reference may be made to FIG. 15 where exemplary calculations are shown for each tab associated with SEGMENT A through SEGMENT D illustrated in FIG. 14.

FIG. 16 is a diagrammatic illustration of the existing frame error for each tab processed through the method steps of FIG. 13. As shown, the existing stream error after the first tab 706 is processed is zero although the tab error was 0.2. This is possible since the entire audio component is shifted forward in time to aligned the first audio frame start time with the start time of the first video frame. However, when the second tab 708 is processed, the existing stream error will be 0.2 which is a result of shifting the entire audio component "20% of an audio frame" forward in time (i.e., the audio is 20% of an audio frame ahead of the video component). After the third tab 710 is processed, the existing error will be −0.3, which means that the audio component as a whole is shifted back "30% of an audio frame."

For completeness, the following illustrates how the error is substantially maintained to be not more than "half a frame error" after a particular tab is processed. By way of example: after the fourth tab 712 is processed, the audio component will be 10% of an audio frame ahead of the video component; after the fifth tab 714 is processed, the audio component will be 50% of an audio frame behind the video component; after the sixth tab 716 is processed, the audio component will be 40% of an audio frame ahead of the video component; after the seventh tab 718 is processed, the audio component will be 50% of an audio frame ahead of the video component; and after the eight exemplary tab is processed, the audio component will be 40% of an audio frame ahead of the video component.

Since the existing stream error is prevented from exceeding a half an audio frame, the video frames will be substantially synchronized with the audio frames without regard to the number of segments being stitched together after successive copy operations. It should be appreciated that if corrections were not made by dropping or retaining audio frames as described above, the cumulative stream error would grow and propagate as additional audio and video segments were stitched together. Consequently, when the error grows to multiple audio frames, the audio component will no longer be synchronized with the video component and therefore be incomprehensible. That is, the audio content of a copied segment will not match the content of its associated video frame.

The invention employs various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 17:
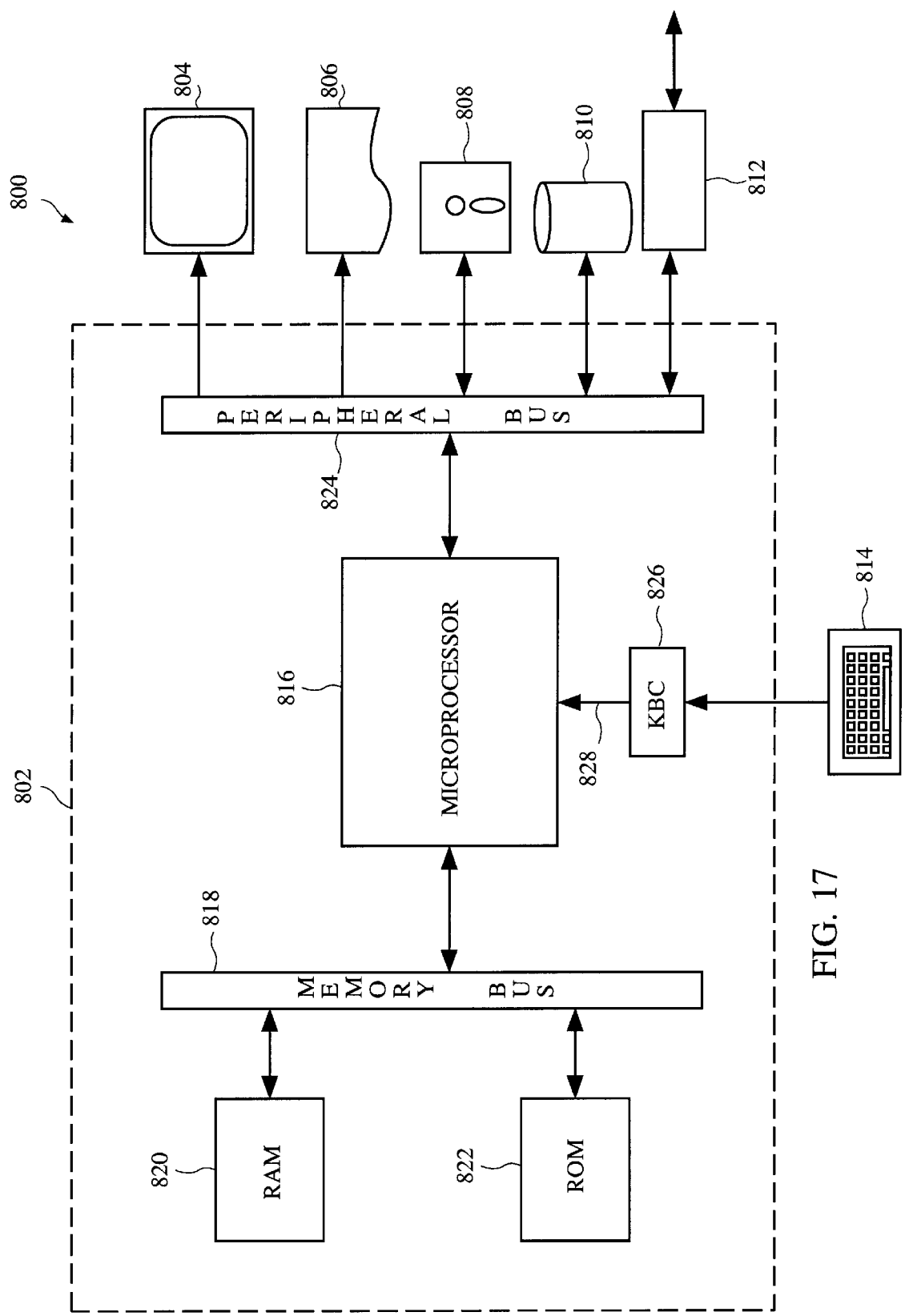
FIG. 17 is a block diagram of an exemplary computer system for carrying out the editing steps in accordance with one embodiment of the present invention.

FIG. 17 is a block diagram of an exemplary computer system 800 for carrying out the processing according to the invention. The computer system 800 includes a digital computer 802, a display screen (or monitor) 804, a printer 806, a floppy disk drive 808, a hard disk drive 810, a network interface 812, and a keyboard 814. The digital computer 802 includes a microprocessor 816, a memory bus 818, random access memory (RAM) 820, read only memory (ROM) 822, a peripheral bus 824, and a keyboard controller 826. The digital computer 800 can be a personal computer (such as an IBM compatible personal computer), a workstation computer (such as a Sun Microsystems or Hewlett-Packard workstation), or some other type of computer.

The microprocessor 816 is a general purpose digital processor which controls the operation of the computer system 800. The microprocessor 816 can be a single-chip processor or can be implemented with multiple components. Using instructions retrieved from memory, the microprocessor 816 controls the reception and manipulation of input data and the output and display of data on output devices. According to the invention, a particular function of microprocessor 816 is to assist in the processing of audio and video MPEG editing tasks as described above.

The memory bus 818 is used by the microprocessor 816 to access the RAM 820 and the ROM 822. The RAM 820 is used by the microprocessor 816 as a general storage area and as scratch-pad memory, and can also be used to store input data and processed data. The ROM 822 can be used to store instructions or program code followed by the microprocessor 816 as well as other data.

The peripheral bus 824 is used to access the input, output, and storage devices used by the digital computer 802. In the described embodiment, these devices include the display screen 804, the printer device 806, the floppy disk drive 808, the hard disk drive 810, and the network interface 812. The keyboard controller 826 is used to receive input from keyboard 814 and send decoded symbols for each pressed key to microprocessor 816 over bus 828.

The display screen 804 is an output device that displays images of data provided by the microprocessor 816 via the peripheral bus 824 or provided by other components in the computer system 800. The printer device 806 when operating as a printer provides an image on a sheet of paper or a similar surface. Other output devices such as a plotter, typesetter, etc. can be used in place of, or in addition to, the printer device 806.

The floppy disk drive 808 and the hard disk drive 810 can be used to store various types of data. The floppy disk drive 808 facilitates transporting such data to other computer systems, and hard disk drive 810 permits fast access to large amounts of stored data.

The microprocessor 816 together with an operating system operate to execute computer code and produce and use data. The computer code and data may reside on the RAM 820, the ROM 822, or the hard disk drive 820. The computer code and data could also reside on a removable program medium and loaded or installed onto the computer system 800 when needed. Removable program mediums include, for example, CD-ROM, PC-CARD, floppy disk and magnetic tape.

The network interface 812 is used to send and receive data over a network connected to other computer systems. An interface card or similar device and appropriate software implemented by the microprocessor 816 can be used to connect the computer system 800 to an existing network and transfer data according to standard protocols.

The keyboard 814 is used by a user to input commands and other instructions to the computer system 800. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

The following MPEG audio and video standards described above are hereby incorporated by reference: (1) a document entitled "Generic Coding of Moving Pictures and Associated Audio Information: Video," ISO/IEC 13818-2; (2) a document entitled "Coding of Moving Pictures and Associated Audio for Digital Storage Media at up to about 1.5 MBit/s" (Part 1 System, Part 2 Video, Part 3 Audio) 11171/11172 (1995/1996); and (3) a document entitled "Generic Coding of Moving Pictures and Associated Audio Information" ISO/IEC 13818-3. All above-referenced MPEG standard documents and future MPEG standard documents may be obtained form ISO/IEC Case Postale 56, CH-1211, Geneva 20, Switzerland.

Although the preferred embodiments of the present invention have been described in detail, it should be understood that the present invention may be embodied in many other specific forms without departing from the spirit or scope of the invention. In the above embodiments a distributed architecture has been described. Such an architecture has a number of advantages particularly in terms of modularity and ease of introducing new functionalities.

By way of example, new functionalities may be created merely by providing an additional "plug-in" operator object which may utilize many of the same component objects, such as the seeker, the decoder, the encoder, etc. While such a distributed architecture is believed to work particularly well, it should be appreciated that similar functionalities may be accomplished using other architectures as well. Therefore, the present examples and embodiments are to be considered as illustrative and not restrictive, and the invention is not to be limited to the details given herein, but may be modified within the scope and equivalence of the appended claims.

What is claimed is:

1. A method of stitching first and second audiovisual segments together, each audiovisual segment having a multiplicity of audio frames including a first audio frame, a second audio frame that sequentially follows the first audio frame and a last audio frame, and a multiplicity of video frames including a first video frame and a last video frame, the method comprising the steps of:

aligning an initial audio frame in the first audiovisual segment with the first video frame in the first audiovisual segment;

wherein the first audio frame is designated as a tab-in audio frame from the first audiovisual segment when a tab error associated with the first audio frame from the first audiovisual segment is less than half a frame; and the second audio frame is designated the tab-in audio frame from the first audiovisual segment when a tab error associated with the first audio frame from the first audiovisual segment is greater than half a frame; and stitching the first and second audiovisual segments together.

2. A method of stitching first and second audiovisual segments together as recited in claim 1, further comprising the steps of:

designating the last audio frame as a tab-out audio frame from the first audiovisual segment when a tab error associated with the last audio frame from the first audiovisual segment is less than a frame; and dropping the tab-out audio frame when a cumulative stream error is greater than about half a frame.

3. A method of stitching first and second audiovisual segments together as recited in claim 2, wherein the cumulative stream error includes an existing steam error and the tab error.

4. A method of stitching first and second audiovisual segments together as recited in claim 3, wherein the existing stream error is re-calculated after each one of the tab-in and tab-out audio frames are dropped and retained.

5. A method of stitching first and second audiovisual segments together as recited in claim 4, wherein the existing stream error for the initial audio frame alignment is zero.

6. A method of stitching first and second audiovisual segments together as recited in claim 5, further comprising the steps of:
   shifting the multiplicity of audio frames in the first audiovisual segment forward in time after the step of aligning the initial audio frame in the first audiovisual segment; and
   re-calculating the existing stream error after aligning the initial audio frame.

7. A method of stitching first and second audiovisual segments together as recited in claim 3, further comprising the steps of:
   designating a first audio frame as a tab-in audio frame from the second audiovisual segment when a tab error associated with the first audio frame from the second audiovisual segment is less than a frame; and
   dropping the tab-in audio frame when the cumulative stream error is greater than about half a frame.

8. A method of joining edited first and second audiovisual segments, each audiovisual segment having a multiplicity of audio frames including a first audio frame, a second audio frame that sequentially follows the first audio frame and a last audio frame, and a multiplicity of video frames including a first video frame and a last video frame, the method comprising the steps of:
   aligning a tab-in audio frame in the first audiovisual segment with the first video frame in the first audiovisual segment;
      wherein the first audio frame from the first audiovisual segment is designated as the tab-in audio frame when a tab error associated with the first audio frame from the first audiovisual segment is less than about half an audio frame; and
      wherein the second audio frame from the first audiovisual segment is designated as the tab-in audio frame when a tab error associated with the first audio frame from the first audiovisual segment is greater than about half an audio frame; and
      wherein the first audio frame from the first audiovisual segment is dropped when the second audio frame from the first audiovisual segment is designated as the tab-in audio frame;
   determining whether a cumulative error associated with the last audio frame in the first segment exceeds about half an audio frame, and dropping the last audio frame in the first segment when it is determined that the cumulative error associated with the last audio frame exceeds about half an audio frame;
   determining whether a cumulative error associated with a first audio frame in the second segment exceeds about half an audio frame, and dropping the first audio frame in the second segment when it is determined that the cumulative error associated with the first audio frame exceeds half a frame; and
   whereby the multiplicity of audio frames of the first and second segments are substantially synchronized with the multiplicity of video frames of the first and second segment.

9. A method of joining edited first and second audiovisual segments as recited in claim 8, wherein the cumulative error includes an existing stream error and a current tab error.

10. A method of joining edited first and second audiovisual segments as recited in claim 9, further comprising the step of:
    calculating the existing stream error after each previous tab is either dropped or retained.

11. A method of joining edited first and second audiovisual segments as recited in claim 9, wherein the existing stream error for the tab-in audio frame of the first audiovisual segments is zero, and the tab error of the tab-in audio frame is carried forward as the existing stream error when calculating the cumulative error associated with the last audio frame.

12. A method of joining edited first and second audiovisual segments as recited in claim 11, further comprising the step of:
    shifting the multiplicity of audio frames of the first audiovisual segment forward in time when the first audio frame of the first audiovisual segment is designated as the tab-in audio frame.

13. A method of joining edited first and second audiovisual segments as recited in claim 11, further comprising the step of:
    shifting the multiplicity of audio frames of the first audiovisual segment backwards in time when the second audio frame of the first audiovisual segment is designated as the tab-in audio frame.

14. A method of joining edited first and second audiovisual segments as recited in claim 11, wherein the last audio frame in the first and second audiovisual segments are designated a tab-out audio frame.

15. An apparatus for stitching first and second audiovisual segments, each audiovisual segment having a multiplicity of audio frames including a first audio frame, a second audio frame that sequentially follows the first audio frame and a last audio frame, and a multiplicity of video frames including a first video frame and a last video frame, the apparatus comprising:
    an aligner configured to align an initial audio frame in the first audiovisual segment with the first video frame in the first audiovisual segment, the initial audio frame being the first audio frame from the first audiovisual segment when a tab error associated with the first audio frame from the first audiovisual segment is less than about half an audio frame.

16. An apparatus for stitching first and second audiovisual segments as recited in claim 15, wherein the second audio frame from the first audiovisual segment is the initial audio frame when a tab error associated with the first audio frame from the first audiovisual segment is greater than about half an audio frame.

17. An apparatus for stitching first and second audiovisual segments as recited in claim 16, wherein the first audio frame from the first audiovisual segment is dropped-when the second audio frame from the first audiovisual segment is the initial audio frame.

18. An apparatus for stitching first and second audiovisual segments as recited in claim 17, further comprising:
    a cumulative error calculator configured to sum together an existing stream error and a tab error associated with a current tab.

19. An apparatus for stitching first and second audiovisual segments as recited in claim 18, wherein the last audio frame in the first audiovisual segment is dropped when the cumulative error calculator determines that a cumulative error associated with the last audio frame in the first audiovisual segment exceeds about half an audio frame.

20. An apparatus for stitching first and second audiovisual segments as recited in claim 19, wherein the last audio frame in the first audiovisual segment is retained when the cumulative error calculator determines that a cumulative error associated with the last audio frame in the first audiovisual segment is less than about half an audio frame.

21. An apparatus for stitching first and second audiovisual segments as recited in claim 18, wherein a first audio frame in the second audiovisual segment is dropped when the cumulative error calculator determines that a cumulative error associated with the first audio frame in the second audiovisual segment exceeds about half an audio frame.

22. An apparatus for stitching first and second audiovisual segments as recited in claim 21, wherein the first audio frame in the second audiovisual segment is retained when the cumulative error calculator determines that a cumulative error associated with the first audio frame in the second audiovisual segment is less than about half an audio frame.

23. An apparatus for stitching first and second audiovisual segments as recited in claim 17, wherein when the aligner aligns the initial audio frame of the first audiovisual segment the multiplicity of audio frames are shifted in time.

24. An apparatus for stitching first and second audiovisual segments as recited in claim 23, wherein the multiplicity of audio frames are shifted forward in time when the first audio frame is the initial audio frame.

25. An apparatus for stitching first and second audiovisual segments as recited in claim 23, wherein the multiplicity of audio frames are shifted backwards in time when the second audio frame is the initial audio frame.

26. An apparatus for stitching first and second audiovisual segments as recited in claim 18, wherein the existing stream error for the initial audio frame in the first audiovisual segments is zero.

27. An apparatus for stitching first and second audiovisual segments as recited in claim 20, wherein the existing stream error for the last audio frame in the first audiovisual segment is the tab error of the initial audio frame in the first audiovisual segment.

28. A computer readable media containing program instructions for stitching first and second audiovisual segments together, each audiovisual segment having a multiplicity of audio frames including a first audio frame, a second audio frame that sequentially follows the first audio frame and a last audio frame, and a multiplicity of video frames including a first video frame and a last video frame, said computer readable media comprising:

program instructions for aligning an initial audio frame in the first audiovisual segment with the first video frame in the first audiovisual segment;
wherein the first audio frame is designated as a tab-in audio frame from the first audiovisual segment when a tab error associated with the first audio frame from the first audiovisual segment is less than half a frame; and the second audio frame is designated the tab-in audio frame from the first audiovisual segment when a tab error associated with the first audio frame from the first audiovisual segment is greater than half a frame; and program instructions for stitching the first and second audiovisual segments together.

\* \* \* \* \*